United States Patent
Zhao et al.

(10) Patent No.: US 12,035,144 B2
(45) Date of Patent: Jul. 9, 2024

(54) SPECTRUM MANAGEMENT DEVICE, ELECTRONIC DEVICE, RADIO COMMUNICATION METHOD, AND STORAGE MEDIUM

(71) Applicant: Sony Group Corporation, Tokyo (JP)

(72) Inventors: Youping Zhao, Beijing (CN); Yu Zhao, Beijing (CN); Mengting Lin, Beijing (CN); Chen Sun, Beijing (CN); Xin Guo, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 422 days.

(21) Appl. No.: 17/417,785

(22) PCT Filed: Jan. 22, 2020

(86) PCT No.: PCT/CN2020/073664
§ 371 (c)(1),
(2) Date: Jun. 24, 2021

(87) PCT Pub. No.: WO2020/156397
PCT Pub. Date: Aug. 6, 2020

(65) Prior Publication Data
US 2022/0078625 A1 Mar. 10, 2022

(30) Foreign Application Priority Data
Jan. 29, 2019 (CN) .......................... 201910085366.6

(51) Int. Cl.
*H04W 16/14* (2009.01)
*H04W 72/541* (2023.01)

(52) U.S. Cl.
CPC ......... *H04W 16/14* (2013.01); *H04W 72/541* (2023.01)

(58) Field of Classification Search
CPC ... H04W 72/30; H04W 72/541; H04W 16/10; H04W 16/14
(Continued)

(56) References Cited

U.S. PATENT DOCUMENTS

| 11,907,390 B2 * | 2/2024 | Li ......................... G06F 21/602 |
| 2015/0223077 A1 * | 8/2015 | Fan ....................... H04W 72/30 |
| | | 370/312 |

(Continued)

FOREIGN PATENT DOCUMENTS

| CA | 3022270 A1 | 11/2017 |
| CN | 101277542 A | 10/2008 |

(Continued)

OTHER PUBLICATIONS

N. Wiebusch and U. Meier, "Evolutionary Resource Allocation Optimization for Wireless Coexistence Management," 2018 IEEE 23rd International Conference on Emerging Technologies and Factory Automation (ETFA), Turin, Italy, 2018, pp. 1197-1200, doi: 10.1109/ETFA.2018.8502449. (Year: 2018).*

(Continued)

*Primary Examiner* — William D Cumming
(74) *Attorney, Agent, or Firm* — XSENSUS LLP

(57) ABSTRACT

A spectrum management device, an electronic device, a radio communication method, and a storage medium. The spectrum management device is located in a coexistence system. The coexistence system includes at least two radio access networks using different radio access technologies. The spectrum management device includes a processing circuit, and is configured to: generate an interference overlapping graph for the coexistence system; and allocate spectrum resources for the at least two radio access networks according to the interference overlapping graph. By using the spectrum management device, the electronic device, the (Continued)

radio communication method, and the storage medium, spectrum resources can be reasonably allocated to a secondary system in the coexistence system comprising multiple radio access technologies.

10 Claims, 17 Drawing Sheets

(58) Field of Classification Search
USPC .......................................................... 370/312
See application file for complete search history.

(56) References Cited

U.S. PATENT DOCUMENTS

| | | | |
|---|---|---|---|
| 2017/0238334 A1 | 8/2017 | Yang et al. | |
| 2018/0091981 A1* | 3/2018 | Sharma | G08G 1/0112 |
| 2018/0124792 A1* | 5/2018 | Khoshnevisan | H04W 16/10 |
| 2018/0132111 A1 | 5/2018 | Mueck | |
| 2018/0132112 A1* | 5/2018 | Khoshnevisan | H04W 16/14 |
| 2018/0242165 A1 | 8/2018 | Macmullan et al. | |
| 2018/0376341 A1 | 12/2018 | Khoshnevisan | |
| 2022/0078625 A1* | 3/2022 | Zhao | H04W 72/541 |
| 2023/0067463 A1* | 3/2023 | Zhao | G06F 16/29 |
| 2023/0409728 A1* | 12/2023 | Li | G06F 21/6218 |

FOREIGN PATENT DOCUMENTS

| | | | | |
|---|---|---|---|---|
| CN | 101730230 | A | 6/2010 | |
| CN | 102970683 | A | 3/2013 | |
| CN | 104023339 | A | 9/2014 | |
| CN | 104105141 | A | 10/2014 | |
| CN | 104202747 | A | 12/2014 | |
| CN | 104349328 | A | 2/2015 | |
| CN | 105580479 | A | 5/2016 | |
| CN | 105981425 | A | 9/2016 | |
| CN | 106162913 | A | 11/2016 | |
| CN | 106604401 | A | 4/2017 | |
| CN | 107113795 | A | 8/2017 | |
| CN | 107371165 | A | 11/2017 | |
| CN | 107396369 | A | 11/2017 | |
| CN | 107995628 | A | 5/2018 | |
| CN | 108307395 | A | 7/2018 | |
| CN | 108365901 | A | 8/2018 | |
| CN | 108476120 | A | 8/2018 | |
| CN | 108702627 | A | 10/2018 | |
| CN | 109041066 | A | 12/2018 | |
| CN | 109155917 | A | 1/2019 | |
| CN | 111491301 | A | 8/2020 | |
| EP | 3 787 248 | A1 | 3/2021 | |
| EP | 3 905 746 | A1 | 11/2021 | |
| GB | 2595114 | A * | 11/2021 | H04W 16/14 |
| TW | 201828731 | A | 8/2018 | |
| WO | WO-2009119463 | A2 | 10/2009 | |
| WO | WO-2009119779 | A2 | 10/2009 | |
| WO | WO-2017130494 | A1 | 8/2017 | |
| WO | WO-2017198024 | A1 * | 11/2017 | H04W 16/10 |
| WO | WO-2018175639 | A1 | 9/2018 | |
| WO | WO-2018211337 | A1 | 11/2018 | |

OTHER PUBLICATIONS

English translation of CN101730230A, Nov. 2023 (Year: 2023).*
International Search Report and Written Opinion mailed on Apr. 22, 2020, received for PCT Application PCT/CN2020/073664, Filed on Jan. 22, 2020, 8 pages including English Translation.
Ericsson, "Candidate Spectrum for NR Unlicensed Operation" 3GPP TSG RAN WG1 Meeting #92, R1-1802773, Feb. 26-30, 2018, 4 pages.
Dish Network, "CBRS 3.5 GHz band for LTE in the United States", 3GPP tsg_ran\WG4_Radio, 第 TSGR4 80 期 Aug. 22, 2016 R4-165162 全文 1-3.

* cited by examiner

SPECTRUM MANAGEMENT DEVICE, ELECTRONIC DEVICE, RADIO COMMUNICATION METHOD, AND STORAGE MEDIUM

CROSS-REFERENCE TO RELATED APPLICATIONS

The present application is based on PCT filing PCT/CN2020/073664, filed Jan. 22, 2020, which claims the priority to Chinese Patent Application No. 201910085366.6, titled "SPECTRUM MANAGEMENT DEVICE, ELECTRONIC DEVICE, RADIO COMMUNICATION METHOD, AND STORAGE MEDIUM", filed on Jan. 29, 2019 with the Chinese Patent Office, each of which is incorporated herein by reference in its entirety.

FIELD

The embodiments of the present disclosure relate to the field of wireless communications, and in particular to a spectrum management apparatus, an electronic apparatus, a wireless communication method and a computer readable storage medium. More specifically, the present disclosure relates to a spectrum management apparatus in a wireless communication system, an electronic apparatus serving as a spectrum division apparatus in a wireless communication system, an electronic apparatus serving as a secondary system in a wireless communication system, a wireless communication method performed by a spectrum management apparatus in a wireless communication system, a wireless communication method performed by a spectrum division apparatus in a wireless communication system, a wireless communication method performed by a secondary system in a wireless communication system, and a computer readable storage medium.

BACKGROUND

Dynamic Spectrum Access (DSA) technology is to play an important role in future wireless communications. With the Dynamic Spectrum Access (DSA) technology, the utilization of spectrum resources can be improved to effectively alleviate the shortage of spectrum resources, and interference between coexisting networks can be avoided or suppressed. For the Citizen Broadband Radio Service (CBRS) supported by the Federal Communications Commission (FCC), the spectrum for commercial users ranges from 3550 MHz to 3700 MHz. Currently, the CBRS frequency band (150 MHz in total) is managed by a spectrum access system (SAS). A system that is authorized to use the spectrum may be considered as a primary system. A communication system that is not authorized and dynamically accesses the licensed spectrum according to a rule may be considered as a secondary system. Alternatively, the secondary system may be a system which is authorized to use the spectrum, and has a lower priority than the primary system in using the spectrum. In a system in which primary systems and secondary systems coexist, for example, a spectrum management apparatus in the SAS may allocate spectrum resources to the secondary systems controlled by the spectrum management apparatus, so that the secondary systems can use spectrum resources within an available spectrum resource range.

The secondary systems managed by the spectrum management apparatus may use different radio access technologies (RATs). In a coexistence system using multiple RATs, the topology of the CBRS network dynamically changes due to changes of an online-offline status of each of the secondary systems, the real-time changes in service load, and other factors, complicating the spectrum division in the CBRS coexistence network using multiple RATs. In addition, how to balance the interference between different RAT networks and improve the spectrum utilization of the CBRS coexistence network is a technical problem to be solved urgently. In addition, in a CBRS network where, for example, LTE-TDD (Time Division Duplexing) and LTE-LBT (Listen Before Talk) coexist, it is required to allocate sufficient guard bands for secondary systems using different RATs. However, according to the current CBRS standard, issues such as spectrum division and guard band configuration for a CBRS coexistence network including multiple RATs have not been discussed.

Therefore, it is required to propose a technical solution to reasonably allocate spectrum resources for secondary systems in a coexistence system using multiple radio access technologies.

SUMMARY

A brief summary of the present disclosure is given hereinafter, and the summary is not intended to fully disclose the full scope or all features of the present disclosure.

According to the present disclosure, a spectrum management apparatus, an electronic apparatus, a wireless communication method and a computer readable storage medium are provided to reasonably allocate spectrum resources for secondary systems in a coexistence system using multiple radio access technologies.

A spectrum management apparatus in a coexistence system is provided according to an aspect of the present disclosure. The coexistence system includes at least two radio access networks using different radio access technologies. The spectrum management apparatus includes processing circuitry. The processing circuitry is configured to: generate an interference overlap graph of the coexistence system; and allocate spectrum resources for the at least two radio access networks based on the interference overlap graph.

An electronic apparatus in a coexistence system is provided according to another aspect of the present disclosure. The coexistence system includes a first radio access network using a first radio access technology and a second radio access network using a second radio access technology. The first radio access network includes the electronic apparatus. The electronic apparatus includes processing circuitry. The processing circuitry is configured to: receive, from a spectrum management apparatus in the coexistence system, an interference overlap graph of the coexistence system, spectrum resources allocated for the first radio access network based on the interference overlap graph, and spectrum resources allocated for the second radio access network based on the interference overlap graph; and determine a spectrum resources allocation scheme for secondary systems in the coexistence system based on the interference overlap graph, the spectrum resources allocated for the first radio access network and the spectrum resources allocated for the second radio access network.

A wireless communication method performed by a spectrum management apparatus in a coexistence system is provided according to another aspect of the present disclosure. The coexistence system includes at least two radio access networks using different radio access technologies. The wireless communication method includes: generating an interference overlap graph of the coexistence system; and allocating spectrum resources for the at least two radio access networks based on the interference overlap graph.

A wireless communication method performed by an electronic apparatus in a coexistence system is provided according to another aspect of the present disclosure. The coexistence system includes a first radio access network using a first radio access technology and a second radio access network using a second radio access technology. The first radio access network includes the electronic apparatus. The wireless communication method includes: receiving, from a spectrum management apparatus in the coexistence system, an interference overlap graph of the coexistence system, spectrum resources allocated for the first radio access network based on the interference overlap graph, and spectrum resources allocated for the second radio access network based on the interference overlap graph; and determining a spectrum resources allocation scheme for secondary systems in the coexistence system based on the interference overlap graph, the spectrum resources allocated for the first radio access network and the spectrum resources allocated for the second radio access network.

A computer readable storage medium storing computer-executable instructions is provided according to another aspect of the present disclosure. The executable computer instructions, when executed by a computer, cause the computer to perform the wireless communication method according to the present disclosure.

In the spectrum management apparatus, the electronic apparatus, the wireless communication method and the computer readable storage medium according to the present disclosure, in a coexistence system including at least two radio access networks using different radio access technologies, the spectrum management apparatus allocates spectrum resources for the at least two radio access networks based on an interference overlap graph of the coexistence system, then the spectrum division apparatus determines a spectrum resources allocation scheme for secondary systems based on the spectrum resources allocated by the spectrum management apparatus and the interference overlap graph of the coexistence system. According to the present disclosure, the spectrum management apparatus allocates spectrum resources for radio access networks using different radio access technologies based on the interference overlap graph of the coexistence system, thereby reasonably allocating spectrum resources for secondary systems.

Further areas of applicability of the present disclosure will become apparent from the description provided herein. The description and specific embodiments in the summary are illustrative and are not intended to limit the scope of the present disclosure.

BRIEF DESCRIPTION OF THE DRAWINGS

The drawings described herein only illustrate the selected embodiments rather than all embodiments, and are not intended to limit the scope of the present disclosure. In the drawings.

Figure 1:
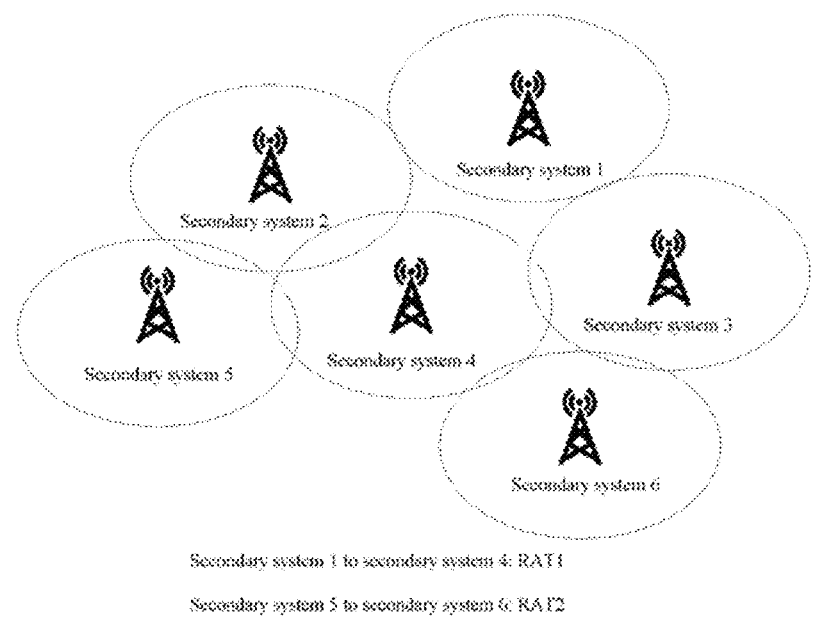
FIG. 1 is a schematic diagram showing an application scenario according to an embodiment of the present disclosure.

Although various modifications and substitutions may be made to the present disclosure, specific embodiments of the present disclosure are shown in the drawings as examples and described in detail herein. It should be understood that, the description of the specific embodiments herein is not intended to limit the present disclosure. The present disclosure is intended to cover all modifications, equivalents and substitutions falling within the spirit and scope of the present disclosure. It should be noted that the reference numerals throughout the drawings indicated corresponding components.

DETAILED DESCRIPTION

The embodiments of the present disclosure are fully described with reference to the drawings. The following description is merely exemplary and is not intended to limit the present disclosure and the application or use thereof.

Exemplary embodiments are provided to detail the present disclosure and fully convey the scope thereof to those skilled in the art. Examples of specific details such as components, devices, methods are described to provide a detailed understanding of the embodiments of the present disclosure. It is apparent for those skilled in the art that the exemplary embodiments may be implemented in many different ways without specific details, and the exemplary embodiments should not be constructed as limitation on the scope of the present disclosure. In some exemplary embodiments, well-known processes, well-known structures and well-known technologies are not described in detail.

The present disclosure is to be described in the following order:

1. Description of a scenario;
2. Configuration examples of a spectrum management apparatus;
3. Configuration examples of a spectrum division apparatus;
4. Configuration examples of a secondary system;
5. Method embodiments; and
6. Application examples.

1. Description of a Scenario

FIG. 1 is a schematic diagram showing an application scenario according to the present disclosure. As shown in FIG. 1, a coexistence system includes six secondary systems: secondary system 1, secondary system 2, secondary system 3, secondary system 4, secondary system 5 and secondary system 6. It is assumed that the radio access technology used by the secondary systems 1 to 4 is different from the radio access technology used by the secondary systems 5 and 6. For ease of illustration, the radio access technology used by the secondary systems 1 to 4 is identified as RAT1, and the radio access technology used by the secondary systems 5 and 6 is identified as RAT2. In addition, the network including the secondary systems 1 to 4 is identified as a first radio access network, and the network including the secondary systems 5 and 6 is identified as a second radio access network. As shown in FIG. 1, the coexistence system includes two radio access networks using different radio access technologies, and the secondary systems in the two radio access networks may interfere with each other.

In this scenario, a spectrum management apparatus, a spectrum division apparatus and a secondary system in a wireless communication system, a wireless communication method performed by the spectrum management apparatus in the wireless communication system, a wireless communication method performed by the spectrum division apparatus in the wireless communication system, a wireless communication method performed by the secondary system in the wireless communication system, and a computer readable storage medium are provided according to the present disclosure to reasonably allocate spectrum resources for secondary systems in a coexistence system using multiple radio access technologies. It should be noted that FIG. 1 only exemplarily shows two radio access networks using different radio access technologies. The coexistence system may include more radio access networks, and each of the radio access networks may include other numbers of secondary systems.

Figure 2:
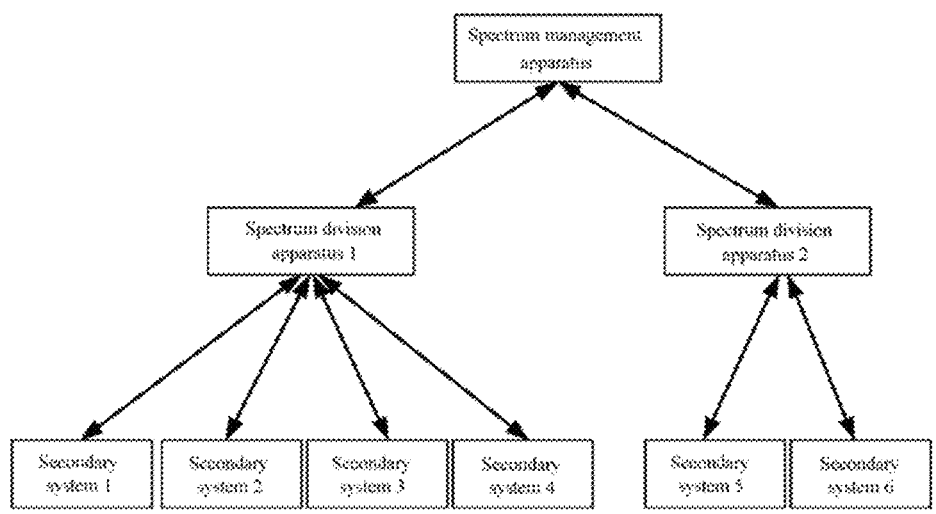
FIG. 2 is a schematic diagram showing a network architecture according to an embodiment of the present disclosure.

FIG. 2 is a schematic diagram showing a network architecture according to an embodiment of the present disclosure. As shown in FIG. 2, the coexistence system may include a spectrum management apparatus, spectrum division apparatuses and secondary systems. Specifically, the coexistence system may include one spectrum management apparatus. That is, a system including all apparatus within the service range of the spectrum management apparatus is called a coexistence system. Further, the coexistence system includes two spectrum division apparatuses, and each of the spectrum division apparatuses manages a radio access network. That is, radio access networks using different radio access technologies may be managed by different spectrum division apparatuses. FIG. 1 shows an example of two radio access networks, and FIG. 2 shows two spectrum division apparatuses: spectrum division apparatus 1 and spectrum division apparatus 2. The coexistence system further includes six secondary systems. Secondary systems 1 to 4 are managed by the spectrum division apparatus 1, and secondary systems 5 and 6 are managed by the spectrum division apparatus 2.

The wireless communication system according to the present disclosure may be a 5G NR wireless communication system. For ease of description, the coexistence system according to the present disclosure may include one spectrum management apparatus, multiple spectrum division apparatuses, and multiple secondary systems. Specifically, the coexistence system according to the present disclosure includes at least two radio access networks using different radio access technologies, and each of the radio access networks is managed by a spectrum division apparatus. That is, a spectrum division apparatus may manage one or more secondary systems.

The spectrum management apparatus and the spectrum division apparatus according to the present disclosure may be implemented as any type of server.

The spectrum management apparatus according to the present disclosure may be a spectrum allocation functional module provided by a geographic location database operator authorized according to national regulations. Different spectrum management apparatus may exchange information with each other. The spectrum management apparatus may determine a range of spectrums to be used by a secondary system based on information such as the use of the spectrum of the primary system, the location of the primary system, and the location of the secondary system. For example, the spectrum management apparatus may be implemented as an SAS. The SAS may or may not have a GSC (general authorized access (GAA) spectrum coordination) function.

The spectrum division apparatus according to the present disclosure may adjust the spectrum used by the secondary system within a range of available spectrum resources. For example, the spectrum division apparatus may be different operators or network providers, or may be a network management organization in an office area, a residential area or a university campus. For example, the spectrum division apparatus may be implemented as a CxM (coexistence manager).

The secondary systems according to the present disclosure may be CBSDs (citizens broadband radio service devices). Specifically, the secondary system may be implemented as an apparatus at network side. The apparatus at network side may be any type of TRP (transmit and receive port) and base station device. For example, the apparatus at network side may be an eNB or a gNB (a base station in the 5th generation communication system). Further, multiple secondary users may be included in a service range of a secondary system.

The radio access technology according to the present disclosure includes, but is not limited to, a TDD access technology, an FDD (frequency division duplexing) access technology, and an LBT access technology.

2. Configuration Examples of a Spectrum Management Apparatus

Figure 3:
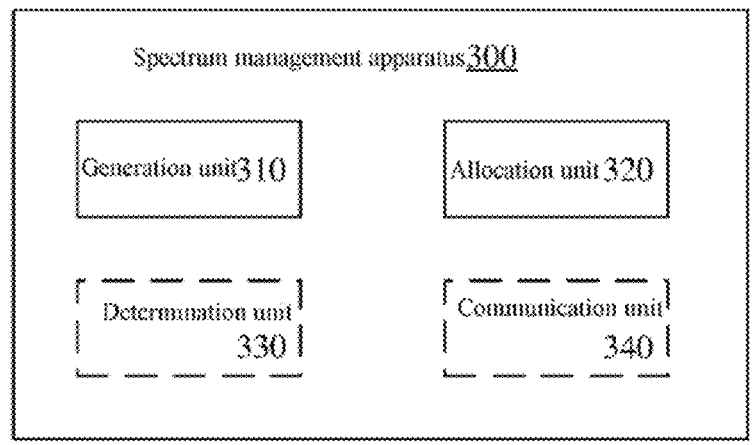
FIG. 3 is a block diagram showing an exemplary configuration of a spectrum management apparatus according to an embodiment of the present disclosure.

FIG. 3 is a block diagram showing an exemplary configuration of a spectrum management apparatus 300 according to an embodiment of the present disclosure. The spectrum management apparatus 300 may be an SAS in a coexistence system. The coexistence system includes at least two radio access networks using different radio access technologies.

As shown in FIG. 3, the spectrum management apparatus 300 may include a generation unit 310 and an allocation unit 320.

The units of the spectrum management apparatus 300 may be included in processing circuitry. It should be noted that the spectrum management apparatus 300 may include one or more processing circuitry. The processing circuitry may include various discrete functional units to perform different functions and/or operations. It should be noted that these functional units may be implemented as physical entities or logical entities, and units with different names may be implemented by a same physical entity.

According to the embodiment of the present disclosure, the generation unit 310 may generate an interference overlap graph of the coexistence system.

According to the embodiment of the present disclosure, the allocation unit 320 may allocate spectrum resources for the at least two radio access networks based on the interference overlap graph generated by the generation unit 310.

Therefore, with the spectrum management apparatus 300 according to the present disclosure, spectrum resources may be allocated for the at least two radio access networks based on the interference overlap graph of the coexistence system, thereby reasonably allocating spectrum resources for the secondary systems.

According to an embodiment of the present disclosure, a node in the interference overlap graph generated by the generation unit 310 represents a secondary system in the coexistence system, and a line between two nodes represents presence of interference between two secondary systems corresponding to the two nodes. All the secondary systems in the coexistence system are respectively represented by a node in the interference overlap graph.

That is, the interference overlap graph generated by the generation unit 310 is for the entire coexistence system.

According to an embodiment of the present disclosure, the spectrum management apparatus 300 may receive registration request information from each of the secondary systems in the coexistence system. Preferably, the registration request information may include information about the secondary system, information about the type of the radio access technology used by the secondary system, and the like. The information about the secondary system may include location information, power information and other information of the secondary system. Further, the generation unit 310 may determine the nodes in the interference overlap graph based on the location information of all the secondary systems in the coexistence system, and may determine whether there is interference between every two secondary systems based on the location information and power information of all the secondary systems in the coexistence system to determine the lines in the interference overlap graph. The generation unit 310 may determine whether there is interference between two secondary systems by using any method known in the art, which is not limited in the present disclosure.

Figure 4:
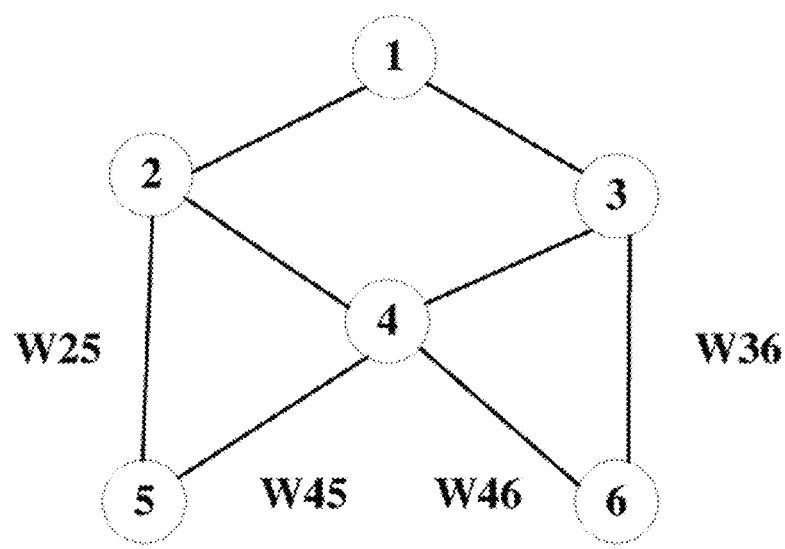
FIG. 4 is a schematic diagram showing an interference overlap graph according to an embodiment of the present disclosure.

FIG. 4 is a schematic diagram showing an interference overlap graph according to an embodiment of the present disclosure. As shown in FIG. 4, the interference overlap graph includes six nodes, which respectively represent the six secondary systems shown in FIG. 1. In FIG. 4, there is a line between node 1 and node 2, indicating that there is interference between secondary system 1 and secondary system 2; and there is no line between node 1 and node 4, indicating that there is no interference between secondary system 1 and secondary system 4. The description for other lines is similar, which is not repeated herein.

According to an embodiment of the present disclosure, the interference overlap graph generated by the generation unit 310 may further include the following parameters: the number of nodes included in each of the radio access networks, the number of lines included in each of the radio access networks, and the number of lines between two nodes respectively included in two radio access networks.

The number of nodes included in each of the radio access networks may include the number of nodes included in each of multiple radio access networks. In the interference overlap graph shown in FIG. 4, the number N1 of nodes included in a first radio access network is four, and the number N2 of nodes included in a second radio access network is two. The number of lines included in each of the radio access networks may include the number of lines included in each of multiple radio access networks. A line included in a radio access network indicates that the two nodes at two ends of the line are included in the same radio access network. In the interference overlap graph shown in FIG. 4, the number E1 of lines included in the first radio access network is four, and the lines included in the first radio access network include a line between node 1 and node 2, a line between node 2 and node 4, a line between node 4 and node 3, and a line between node 3 and node 1. The number E2 of lines included in the second radio access network is zero. The number of lines between two nodes respectively included in two radio access networks may be referred to as the number of lines between two radio access networks. In the interference overlap graph shown in FIG. 4, the number E0 of lines between the first radio access network and the second radio access network is four, and the lines between the first radio access network and the second radio access network include a line between node 2 and node 5, a line between node 4 and node 5, a line between node 4 and node 6, and a line between node 3 and node 6.

According to an embodiment of the present disclosure, the interference overlap graph generated by the generation unit 310 may further include the following parameter: the number C of radio access technologies used in the coexistence system. For example, in the examples shown in FIG. 1 and FIG. 4, the number C of radio access technologies is two. Specifically, the spectrum management apparatus 300 may determine the number of radio access technologies used in the coexistence system based on the information of types of radio access technologies used by the secondary systems included in the registration request information.

According to an embodiment of the present disclosure, the interference overlap graph generated by the generation unit 310 may further include the following parameter: a channel requirement d of each of nodes. For each of the radio access networks, the spectrum management apparatus 300 may determine an average channel requirement D of the radio access network based on the channel requirements of all nodes included in the radio access network. For example, in the example shown in FIG. 4, the spectrum management apparatus 300 may determine an average channel requirement D1 of the first radio access network based on the channel requirements d1, d2, d3, and d4 of the nodes included in the first radio access network, and may determine an average channel requirement D2 of the second radio access network based on the channel requirement d5 and d6 of the nodes included in the second radio access network.

According to an embodiment of the present disclosure, the spectrum management apparatus 300 may receive a spectrum query request from each of the secondary systems in the coexistence system. The spectrum query request includes a channel requirement of the secondary system, so that the spectrum management apparatus 300 may determine a channel requirement d of each of the secondary systems.

According to an embodiment of the present disclosure, the interference overlap graph generated by the generation unit 310 may further include the following parameter: a weight of a line between two nodes corresponding to two secondary systems respectively included in two radio access networks. Further, according to an embodiment of the present disclosure, the spectrum management apparatus 300 may determine the weight of the line between the two nodes corresponding to the two secondary systems respectively included in two radio access networks based on a requirement for a guard band between the two secondary systems. In the example shown in FIG. 4, W25 represents a weight of the line between node 2 and the node 5, and W25 is determined based on a requirement for a guard band between secondary system 2 and secondary system 5. Similarly, W45 represents a weight of the line between node 4 and node 5, W46 represents a weight of the line between node 4 and node 6, and W36 represents a weight of the line between node 3 and node 6.

According to an embodiment of the present disclosure, the generation unit 310 may determine the requirement for the guard band between two secondary systems respectively included in two radio access networks based on the generated interference overlap graph, thereby determining the weight of the corresponding line in the interference overlap graph. Further, the generation unit 310 may determine weights of lines included in the interference overlap graph generated by the generation unit 310 based on weights of lines included in interference overlap graphs of spectrum division apparatuses. According to the embodiment of the present disclosure, each of the spectrum division apparatus may generate the interference overlap graph of the entire coexistence system, and may determine a weight of a line between two nodes, in the interference overlap graph, corresponding to the two secondary systems respectively included in two radio access networks. Further, each of the spectrum division apparatuses may transmit the generated interference overlap graph including weights of lines to the spectrum management apparatus 300. Then, the spectrum management apparatus 300 may determine the weights of the lines in the interference overlap graph generated by the generation unit 310 based on the weights of the lines included in the interference overlap graphs from the spectrum division apparatuses. For example, for a weight of the line between node 2 and node 5 shown in FIG. 4, it is assumed that a weight of a line between node 2 and node 5 included in an interference overlap graph from spectrum division apparatus 1 is W25', and a weight of a line between node 2 and node 5 included in an interference overlap graph from spectrum division apparatus 2 is W25", then the generation unit 310 may determine that W25 in FIG. 4 is equal to an average value of W25' and W25".

Apparently, the manner of determining the weight of the line by calculating an average value is merely an example of the present disclosure. The manner of determining a weight of a line is not limited in the present disclosure.

As described above, the interference overlap graph generated by the generation unit 310 may include one or more of the following parameters: the number of nodes included in each of radio access networks, the number of lines included in each of radio access networks, the number of lines between two nodes respectively included in two radio access networks, the number of radio access technologies used in the coexistence system, a channel requirement of each of nodes, a weight of lines between two nodes corresponding to two secondary systems respectively included in two radio access networks.

As shown in FIG. 3, according to an embodiment of the present disclosure, the spectrum management apparatus 300 may further include a communication unit 340. The communication unit 340 is configured to communicate with an apparatus other than the spectrum management apparatus.

According to an embodiment of the present disclosure, the spectrum management apparatus 300 may transmit the interference overlap graph generated by the generation unit 310 to each of the spectrum division apparatuses or each of the secondary systems in the coexistence system via the communication unit 340. The transmitted interference overlap graph may include one or more of the aforementioned parameters of the interference overlap graph.

According to an embodiment of the present disclosure, the allocation unit 320 may allocate spectrum resources for the at least two radio access networks based on at least one of the parameters of the interference overlap graph.

As shown in FIG. 3, according to an embodiment of the present disclosure, the spectrum management apparatus 300 may further include a determination unit 330. The determination unit 330 is configured to determine a spectrum multiplexing manner for the at least two radio access networks based on the interference overlap graph of the coexistence system. Further, the determination unit 330 may determine a spectrum multiplexing manner for any two of the at least two radio access networks.

According to an embodiment of the present disclosure, the spectrum multiplexing manner includes: a manner of no spectrum multiplexing (which is also known as full spectrum division), a manner of partial spectrum multiplexing and a manner of full spectrum multiplexing.

Figure 5A:
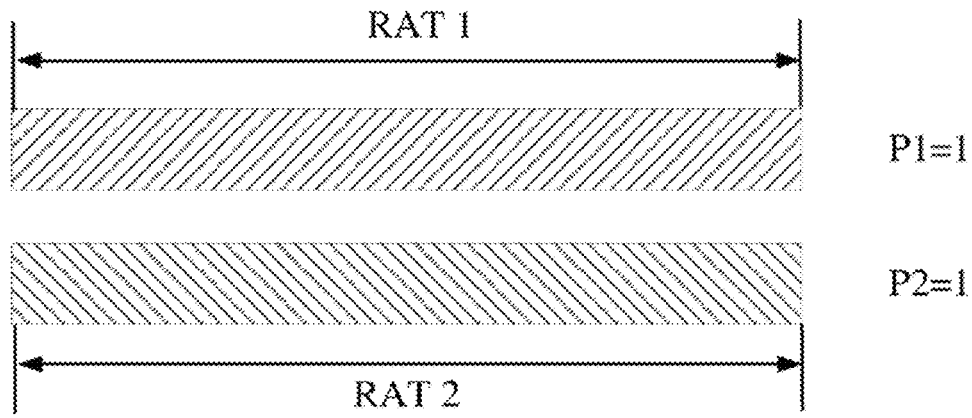
FIG. 5(a) is a schematic diagram showing a manner of full spectrum multiplexing according to an embodiment of the present disclosure.
Figure 5B:
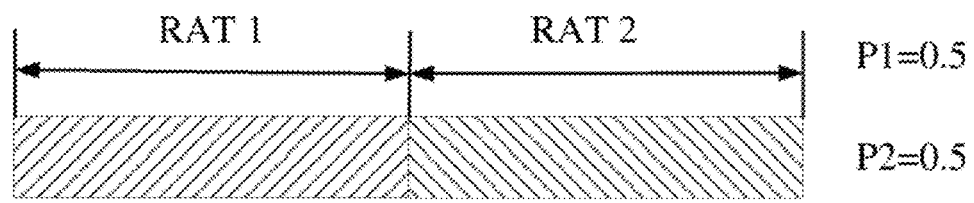
FIG. 5(b) is a schematic diagram showing a manner of no spectrum multiplexing according to an embodiment of the present disclosure.
Figure 5C:
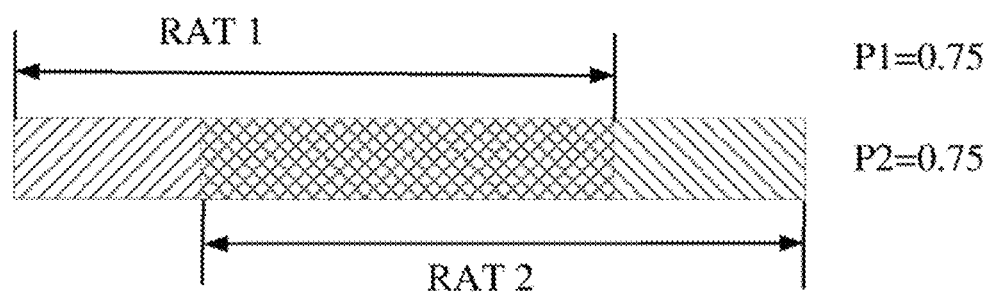
FIG. 5(c) is a schematic diagram showing a manner of partial spectrum multiplexing according to an embodiment of the present disclosure.

FIG. 5(a) is a schematic diagram showing a manner of performing full spectrum multiplexing according to an embodiment of the present disclosure. FIG. 5(b) is a schematic diagram showing a manner of no spectrum multiplexing according to an embodiment of the present disclosure. FIG. 5(c) is a schematic diagram showing a manner of performing partial spectrum multiplexing according to an embodiment of the present disclosure. FIGS. 5(a), 5(b) and 5(c) show several spectrum multiplexing manners by taking two radio access networks as an example. In the FIGS. 5(a), 5(b) and 5(c), the radio access technology used by the first radio access network is identified as RAT1, the radio access technology used by the second radio access network is identified as RAT2, P1 represents a ratio of spectrum resources allocated for the first radio access network to total available spectrum resources, and P2 represents a ratio of spectrum resources allocated for the second radio access network to the total available spectrum resources.

As shown in FIG. 5(a), both the first radio access network and the second radio access network may use the entire available spectrum resources, thus P1 is equal to 1 and P2 is equal to 1. In this manner, the first radio access network and the second radio access network may fully multiplex spectrum resources of each other, which is called a manner of full spectrum multiplexing. As shown in FIG. 5(b), both the first radio access network and the second radio access network may use a part of the entire available spectrum resources, and the spectrum resources for the first radio access network do not overlap with the spectrum resources for the second radio access network, thus the first radio access network and the second radio access network perform no spectrum multiplexing. Although FIG. 5(b) shows an example in which P1 is equal to 0.5 and P2 is equal to 0.5, P1 and P2 may equal to other values. As shown in FIG. 5(c), both the first radio access network and the second radio access network may use a part of the available spectrum resources, and the spectrum resources for the first radio access network overlap with the spectrum resources for the second radio access network, which is called a manner of partial spectrum multiplexing. Although FIG. 5(b) shows an example in which P1 is equal to 0.75 and P2 is equal to 0.75, P1 and P2 may equal to other values, and the values of P1 and P2 may not equal to each other.

According to an embodiment of the present disclosure, the determination unit 330 may determine a spectrum multiplexing manner for the two radio access networks based on one or more of the parameters of the interference overlap graph generated by the generation unit 310. Specifically, the determination unit 330 may determine the spectrum multiplexing manner for the two radio access networks based on one or more of the following parameters: the numbers (N1 and N2) of nodes included in each of the radio access networks, the numbers (E1 and E2) of lines included in each of the radio access networks, and the number (E0) of lines between two nodes respectively included in two radio access networks.

For each of the radio access networks, the number of nodes included in the radio access network indicates a distribution density of the secondary systems in the radio access network. For example, the greater number of nodes included in a radio access network indicates that the distribution density of the secondary systems in the radio access network is greater. For each of the radio access networks, the number of lines included in the radio access network indicates interference in the radio access network. For example, the greater number of lines included in a radio access network indicates that the interference in the radio access network is more serious. The number of lines between two nodes respectively included in two radio access networks indicates interference between the two radio access networks. For example, the greater number of lines between two nodes respectively included in two radio access networks indicates that the interference between the two radio access networks is more serious. Therefore, according to the embodiment of the present disclosure, the determination unit 330 may determine, based on the interference overlap graph generated by the generation unit 310, the distribution density of the secondary systems in each of the radio access networks, the interference in each of the radio access networks, and the interference between any two radio access networks, thereby determining the spectrum multiplexing manner for any two radio access networks.

According to an embodiment of the present disclosure, in a case that the interference between two radio access networks is small, the determination unit 330 may determine the spectrum multiplexing manner for the two radio access networks as the manner of full spectrum multiplexing. For example, in a case that E0 is less than a threshold, the determination unit 330 may determine the spectrum multiplexing manner for the two radio access networks as the manner of full spectrum multiplexing. Preferably, the threshold may be equal to 10.

According to an embodiment of the present disclosure, in a case that distribution densities of secondary systems in two radio access networks are similar, and the two radio access networks almost completely overlap with each other, the determination unit 330 may determine the spectrum multiplexing manner for the two radio access networks as the manner of no spectrum multiplexing, that is, a full division manner. For example, in a case that N1 is approximately equal to N2 (for example, a difference between N1 and N2 is less than a threshold), the determination unit 330 may determine that the distribution densities of the secondary systems in the two radio access networks are similar. In a case that E0 is approximately equal to a sum of E1 and E2 (for example, a difference between E0 and the sum of E1 and E2 is less than a threshold), the determination unit 330 may determine that the two radio access networks almost completely overlap with each other.

According to an embodiment of the present disclosure, in a case that two radio access networks partially overlap with each other, the determination unit 330 may determine the spectrum multiplexing manner for the two radio access networks as the manner of partial spectrum multiplexing. For example, in a case that E0 is less than a sum of E1 and E2, the determination unit 330 may determine that the two radio access networks partially overlap with each other.

According to the above exemplary embodiments, several examples in which the determination unit 330 determines the spectrum multiplexing manner are described, and these examples are not limiting. That is, the determination unit 330 may determine the spectrum multiplexing manner reasonably based on the distribution density of secondary systems in each of the radio access networks, the interference in each of the radio access network, and the interference between any two radio access networks.

According to an embodiment of the present disclosure, the determination unit 330 may further determine a ratio of spectrum resources allocated for each of two radio access networks to total spectrum resources based on the spectrum multiplexing manner of the two radio access networks and the parameters of the interference overlap graph. For the manner of full spectrum multiplexing, this step may be omitted since a ratio of spectrum resources allocated for each of radio access networks to the total spectrum resources is equal to 1.

Specifically, according to an embodiment of the present disclosure, after determining the spectrum multiplexing manner of two radio access networks, the determination unit 330 may determine, for each of the radio access networks, a ratio of spectrum resources allocated for the radio access network to total spectrum resources based on at least one of the following parameters of the interference overlap graph: an average channel requirement of each of radio access networks, a distribution density of secondary systems in each of radio access networks, and interference in each of radio access networks.

According to an embodiment of the present disclosure, the determination unit 330 may determine a ratio of spectrum resources allocated for a radio access network to total spectrum resources based on an average channel requirement of the radio access network. Thus, for a radio access network having a greater average channel requirement, a ratio of spectrum resources allocated for the radio access network to total spectrum resources is greater. The interference overlap graph generated by the generation unit 310 may include a channel requirement of each of the nodes in the coexistence system, thus the determination unit 330 may determine an average channel requirement of each of the radio access networks.

According to an embodiment of the present disclosure, the determination unit 330 may determine a ratio of spectrum resources allocated for a radio access network to total spectrum resources based on a distribution density of secondary systems in the radio access network. Thus, for a radio access network having a greater distribution density of secondary systems, a ratio of spectrum resources allocated for the radio access network to total spectrum resources is greater. For example, for a radio access network including more nodes, a ratio of spectrum resources allocated for the radio access network to total spectrum resources is greater.

According to an embodiment of the present disclosure, the determination unit 330 may determine a ratio of spectrum resources allocated for a radio access network to total spectrum resources based on interference in the radio access network. Thus, for a radio access network having a more serious interference inside, a ratio of spectrum resources allocated for the radio access network to total spectrum resources is greater. For example, for a radio access network including the greater number of lines, a ratio of spectrum resources allocated for the radio access network to total spectrum resources is greater.

As mentioned above, the determination unit 330 may reasonably select one or more of the parameters of the interference overlap graph, and may determine, for each of the radio access networks, a ratio of spectrum resources allocated for the radio access network to total spectrum resources based on the selected parameter.

Figure 6A:
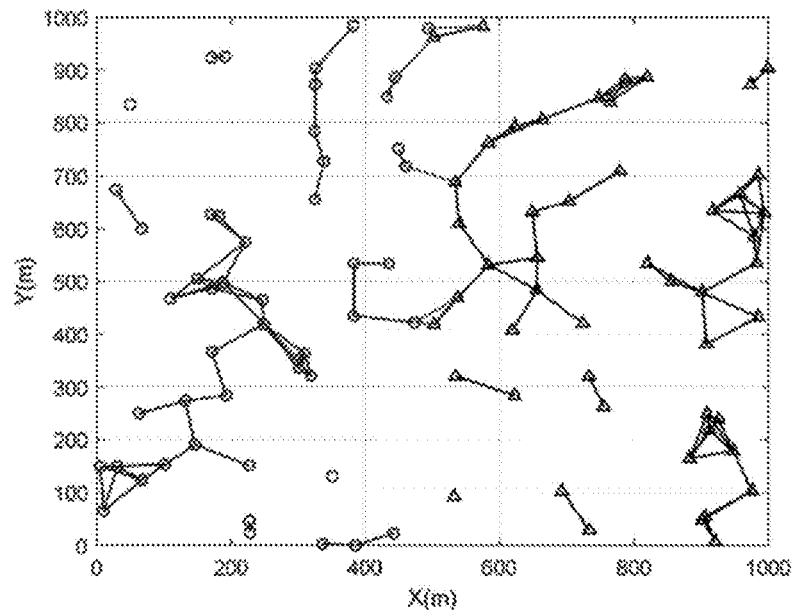
FIG. 6(a) shows an example of an interference overlap graph in performing a manner of full spectrum multiplexing.
Figure 6B:
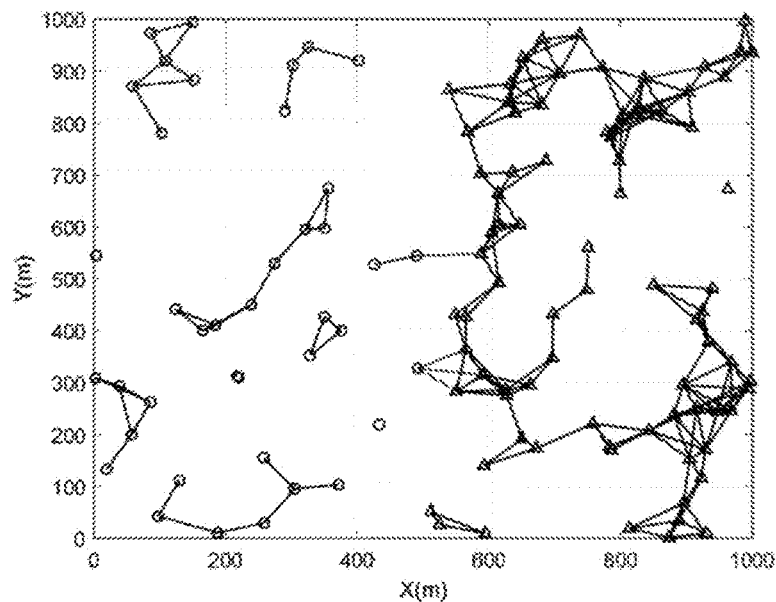
FIG. 6(b) shows an example of an interference overlap graph in performing a manner of full spectrum multiplexing.
Figure 6C:
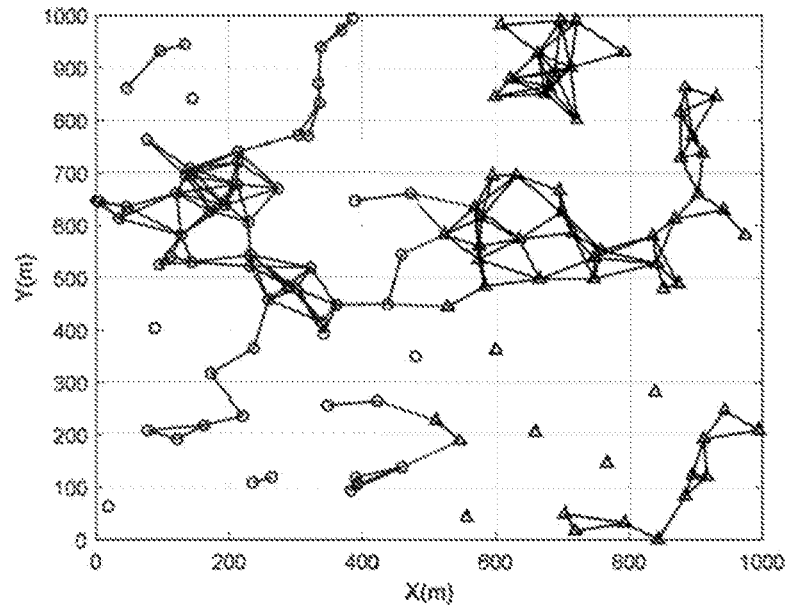
FIG. 6(c) shows an example of an interference overlap graph in performing a manner of full spectrum multiplexing.

FIGS. 6(a) to 6(c) respectively show an example of an interference overlap graph in performing a manner of full spectrum multiplexing. In FIGS. 6(a) to 6(c), circular nodes represent secondary systems in a first radio access network, triangular nodes represent secondary systems in a second radio access network, and X and Y represent two coordinate axes in a two-dimensional coordinate system. In FIG. 6(a), N1 is equal to 50, N2 is equal to 50, E1 is equal to 55, E2 is equal to 62, E0 is equal to 6, D1 is equal to 1.96, and D2 is equal to 1.84. That is, the distribution density of the secondary systems in the first radio access network is similar to the distribution density of the secondary systems in the second radio access network, the average channel requirements of the first radio access network is similar to the average channel requirements of the second radio access network, and interference between the two radio access networks is small. Thus, the determination unit 330 may determine the spectrum multiplexing manner for the two radio access networks as the manner of full spectrum multiplexing. In FIG. 6(b), N1 is equal to 40, N2 is equal to 80, E1 is equal to 37, E2 is equal to 186, E0 is equal to 4, D1 is equal to 2.05, and D2 is equal to 2.05. That is, the distribution density of the secondary systems in the first radio access network is quite different from the distribution density of the secondary systems in the second radio access network, the average channel requirements of the first radio access network is similar to requirements of the second radio access network, and interference between the two radio access networks is small. Thus, the determination unit 330 may determine the spectrum multiplexing manner for the two radio access networks as the manner of full spectrum multiplexing. In FIG. 6(c), N1 is equal to 60, N2 is equal to 60, E1 is equal to 110, E2 is equal to 116, E0 is equal to 6, D1 is equal to 1.52, and D2 is equal to 2.73. That is, the distribution density of the secondary systems in the first radio access network is similar to the distribution density of the secondary systems in the second radio access network, the average channel requirements of the first radio access network is quite different from the average channel requirements of the second radio access network, and interference between the two radio access networks is small. Thus, the determination unit 330 may determine the spectrum multiplexing manner for the two radio access networks as the manner of full spectrum multiplexing. Therefore, without considering the distribution densities of secondary systems respectively in the two radio access networks, the average channel requirement of the two radio access networks and the interference respectively in the two radio access networks, as long as the interference between the two radio access networks is small, the determination unit 330 may determine the spectrum multiplexing manner for the two radio access networks as the manner of full spectrum multiplexing, that is, P1 is equal to 1, and P2 is equal to 1.

Figure 7A:
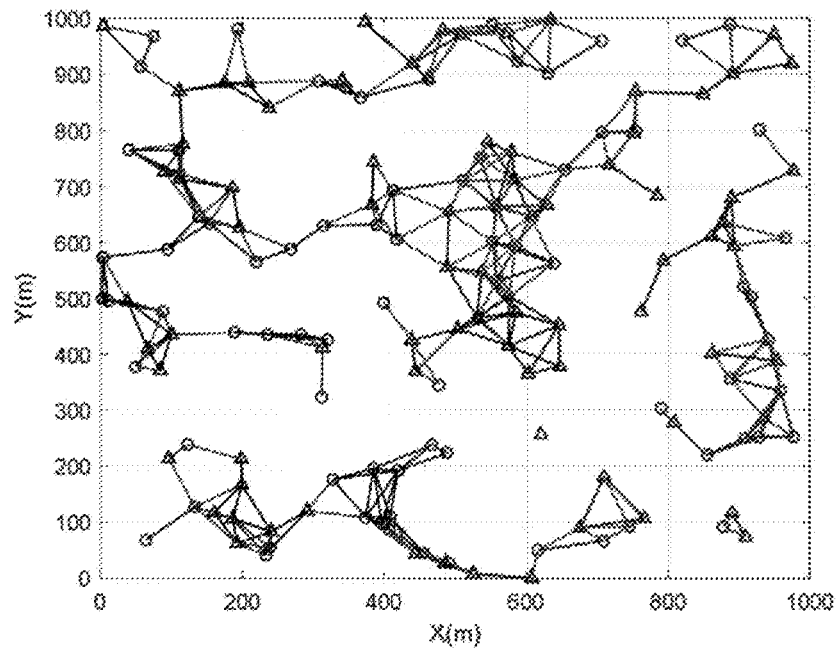
FIG. 7(a) shows an example of an interference overlap graph in performing a manner of partial spectrum multiplexing.
Figure 7B:
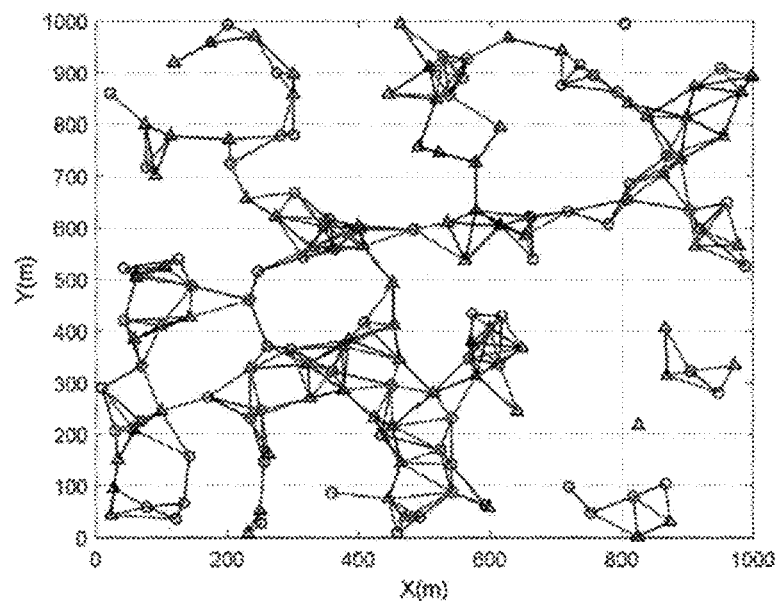
FIG. 7(b) shows an example of an interference overlap graph in performing a manner of partial spectrum multiplexing.
Figure 7C:
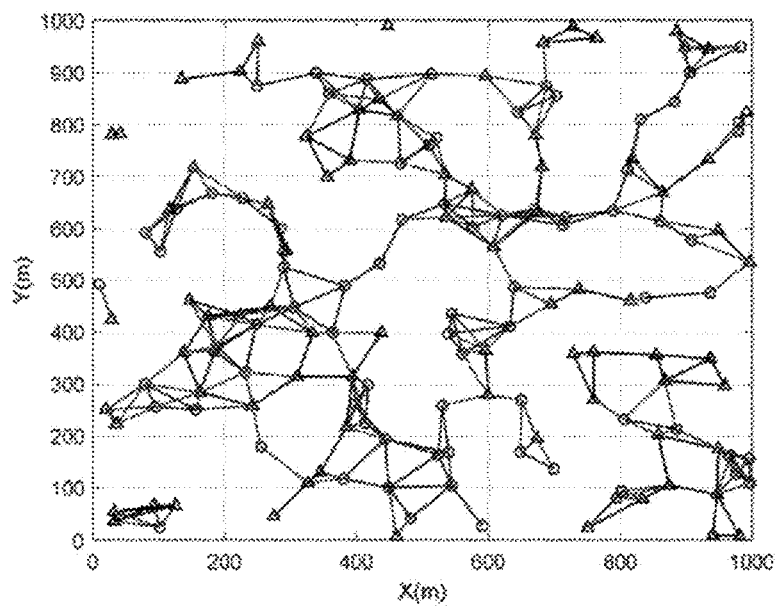
FIG. 7(c) shows an example of an interference overlap graph in performing a manner of partial spectrum multiplexing.
Figure 8A:
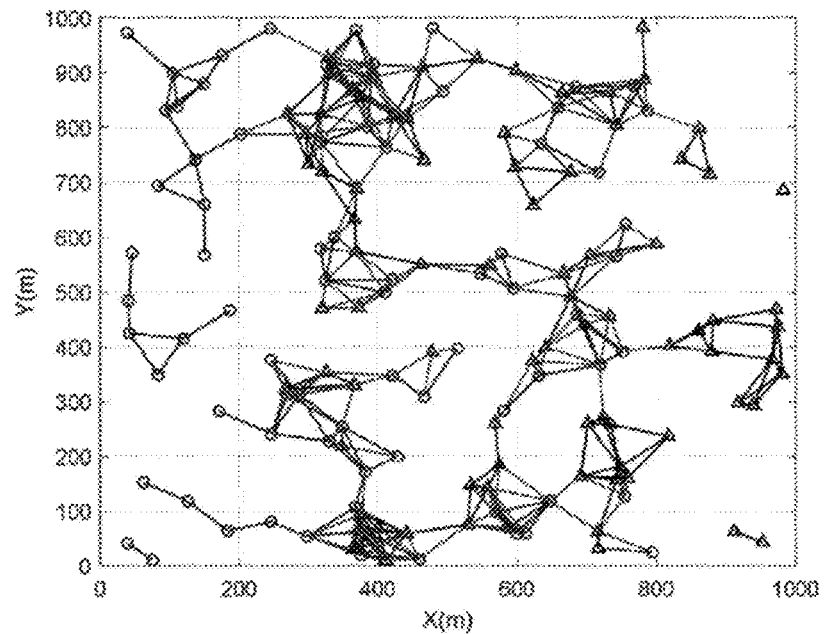
FIG. 8(a) shows an example of an interference overlap graph in performing a manner of no spectrum multiplexing.
Figure 8B:
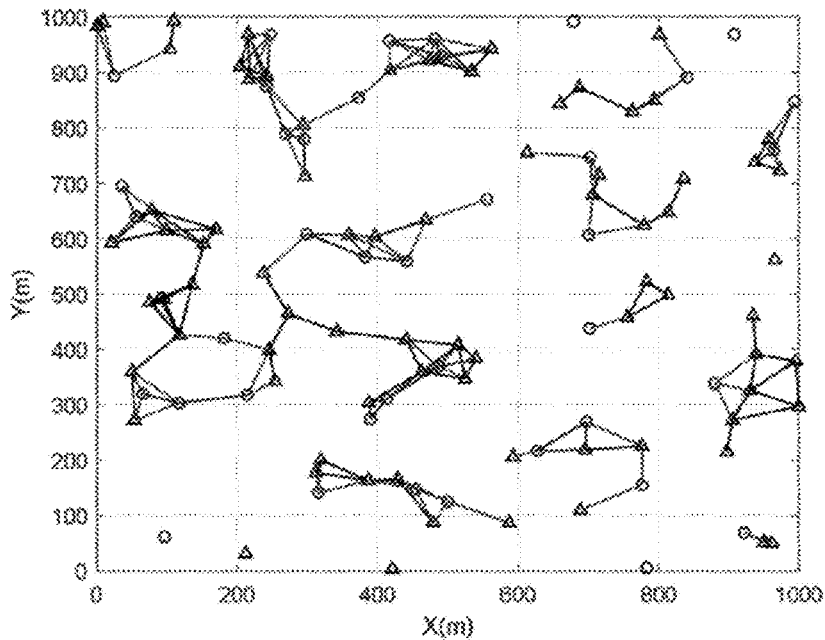
FIG. 8(b) shows an example of an interference overlap graph in performing a manner of no spectrum multiplexing.
Figure 8C:
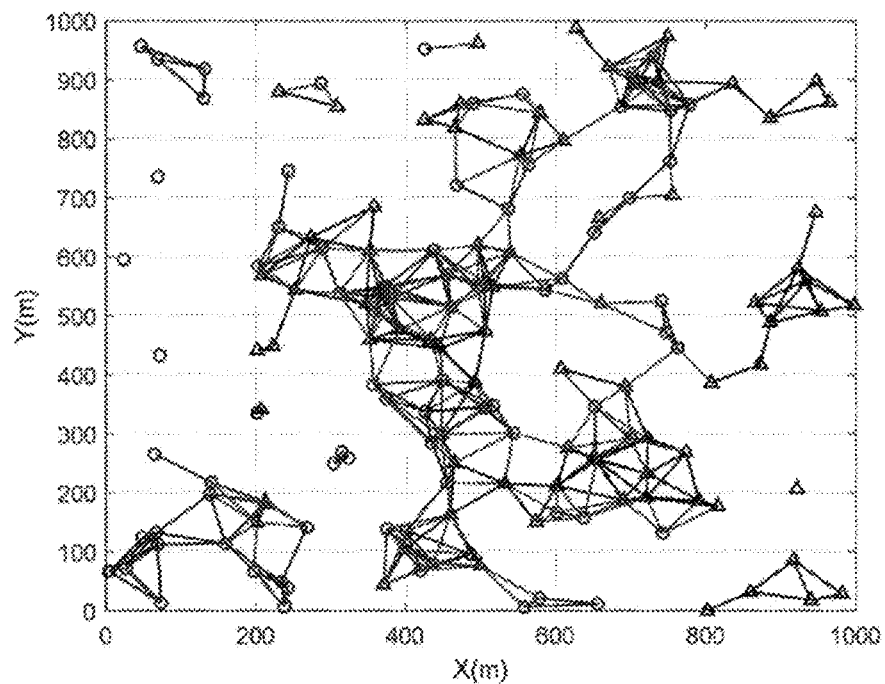
FIG. 8(c) shows an example of an interference overlap graph in performing a manner of no spectrum multiplexing.
Figure 8D:
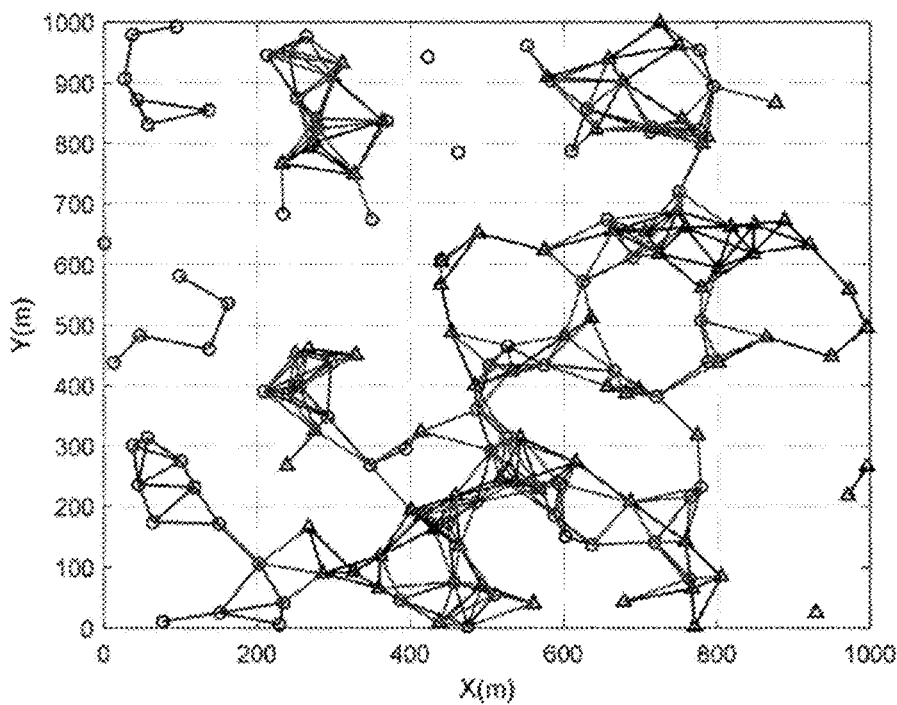
FIG. 8(d) shows an example of an interference overlap graph in performing a manner of no spectrum multiplexing.

FIGS. 7(a) to 7(c) respectively show an example of an interference overlap graph in performing a manner of partial spectrum multiplexing. In FIGS. 7(a) to 7(c), circular nodes represent secondary systems in a first radio access network, triangular nodes represent secondary systems in a second radio access network, and X and Y represent two coordinate axes in a two-dimensional coordinate system. In FIG. 7(a), N1 is equal to 80, N2 is equal to 80, E1 is equal to 94, E2 is equal to 99, E0 is equal to 193, D1 is equal to 1.98, and D2 is equal to 2.01. That is, the distribution density of the secondary systems in the first radio access network is similar to the distribution density of the secondary systems in the second radio access network, the average channel requirement of the first radio access network is similar to the average channel requirement of the second radio access network, and the interference in the first radio access network is similar to the interference in the second radio access network. In addition, the two radio access networks almost completely overlap with each other, that is, E0 is approximately equal to a sum of E1 and E2. Thus, the determination unit 330 may determine the spectrum multiplexing manner for the two radio access networks as the manner of no spectrum multiplexing. Further, the determination unit 330 may determine values of P1 and P2 based on the interference respectively in the two radio access networks and the average channel requirement of the two radio access networks. Thus, for a radio access network having more complex interference inside and having a greater average channel requirement, a ratio of spectrum resources allocated for the radio access network to total spectrum resources is greater. For example, the determination unit 330 may determine that P1 is equal to 0.5 and P2 is equal to 0.5. In FIG. 7(*b*), N1 is equal to 80, N2 is equal to 80, E1 is equal to 88, E2 is equal to 88, E0 is equal to 177, D1 is equal to 1.53, and D2 is equal to 3.02. That is, the distribution density of the secondary systems in the first radio access network is similar to the distribution density of the secondary systems in the second radio access network, the interference in the first radio access network is similar to the interference in the second radio access network, and the average channel requirement of the first radio access network is quite different from requirement of the second radio access network. In addition, the two radio access networks almost completely overlap with each other, that is, E0 is approximately equal to a sum of E1 and E2. Thus, the determination unit 330 may determine the spectrum multiplexing manner for the two radio access networks as the manner of no spectrum multiplexing. Further, the determination unit 330 may determine values of P1 and P2 based on the interference respectively in the two radio access networks and the average channel requirement of the two radio access networks. Thus, for a radio access network having more complex interference inside and having a greater average channel requirement, a ratio of spectrum resources allocated for the radio access network to total spectrum resources is greater. For example, the determination unit 330 may determine that P1 is equal to 0.33 and P2 is equal to 0.67. In FIG. 7(*c*), N1 is equal to 80, N2 is equal to 80, E1 is equal to 96, E2 is equal to 74, E0 is equal to 168, D1 is equal to 2.28, and D2 is equal to 2.18. That is, the distribution density of the secondary systems in the first radio access network is similar to the distribution density of the secondary systems in the second radio access network, the average channel requirement of the first radio access network is similar to the average channel requirement of the second radio access network, and the interference in the first radio access network is quite different from the interference in the second radio access network. In addition, the two radio access networks almost completely overlap with each other, that is, E0 is approximately equal to a sum of E1 and E2. Thus, the determination unit 330 may determine the spectrum multiplexing manner for the two radio access networks as the manner of no spectrum multiplexing. Further, the determination unit 330 may determine values of P1 and P2 based on the interference respectively in the two radio access networks and the average channel requirement of the two radio access networks. Thus, for a radio access network having more complex interference inside and having a greater average channel requirement, a ratio of spectrum resources allocated for the radio access network to total spectrum resources is greater. For example, the determination unit 330 may determine that P1 is equal to 0.6 and P2 is equal to 0.4. Therefore, in a case that the distribution density of the secondary systems in a radio access network is similar to the distribution density of the secondary systems in another second radio access network and the two radio access networks almost completely overlap with each other, the determination unit 330 may determine the spectrum multiplexing manner for the two radio access networks as the manner of no spectrum multiplexing, that is, the full division manner.

FIGS. 8(*a*) to 8(*d*) respectively show an example of an interference overlap graph in performing a manner of no spectrum multiplexing. In FIGS. 8(*a*) to 8(*d*), circular nodes represent secondary systems in a first radio access network, triangular nodes represent secondary systems in a second radio access network, and X and Y represent two coordinate axes in a two-dimensional coordinate system. In FIG. 8(*a*), N1 is equal to 80, N2 is equal to 80, E1 is equal to 100, E2 is equal to 121, E0 is equal to 191, D1 is equal to 1.85, and D2 is equal to 2.08. That is, the distribution density of the secondary systems in the first radio access network is similar to the distribution density of the secondary systems in the second radio access network, the average channel requirement of the first radio access network is similar to average channel requirement of the second radio access network, and the interference in the first radio access network is similar to the interference in the second radio access network. In addition, the two radio access networks partially overlap with each other, that is, E0 is less than a sum of E1 and E2. Thus, the determination unit 330 may determine the spectrum multiplexing manner for the two radio access networks as the manner of partial spectrum multiplexing. Further, the determination unit 330 may determine values of P1 and P2 based on the distribution densities of secondary systems respectively in the two radio access networks, the interference respectively in the two radio access networks, and the average channel requirement of the two radio access networks. Thus, for a radio access network having a greater distribution density of secondary systems, having more complex interference inside and having a greater average channel requirement, a ratio of spectrum resources allocated for the radio access network to total spectrum resources is greater. For example, the determination unit 330 may determine that P1 is equal to 0.6 and P2 is equal to 0.6. In FIG. 8(*b*), N1 is equal to 40, N2 is equal to 80, E1 is equal to 16, E2 is equal to 82, E0 is equal to 92, D1 is equal to 1.95, and D2 is equal to 2.05. That is, the distribution density of the secondary systems in the first radio access network is quite different from the distribution density of the secondary systems in the second radio access network, the average channel requirement of the first radio access network is similar to the average channel requirement of the second radio access network, and the interference in the first radio access network is quite different from the interference in the second radio access network. In addition, the two radio access networks partially overlap with each other, that is, E0 is less than a sum of E1 and E2. Thus, the determination unit 330 may determine the spectrum multiplexing manner for the two radio access networks as the manner of partial spectrum multiplexing. Further, the determination unit 330 may determine values of P1 and P2 based on the distribution densities of secondary systems respectively in the two radio access networks, the interference respectively in the two radio access networks, and the average channel requirement of the two radio access networks. Thus, for a radio access network having a greater distribution density of secondary systems, having more complex interference inside and having a greater average channel requirement, a ratio of spectrum resources allocated for the radio access network to total spectrum resources is greater. For example, the determination unit 330 may determine that P1 is equal to 0.4 and P2 is equal to 0.8. In FIG. 8(*c*), N1 is equal to 80, N2 is equal to 80, E1 is equal to 114, E2 is equal to 120, E0 is equal to 185, D1 is equal to 2.9, and D2 is equal to 1.6. That is, the distribution density of the secondary systems in the first radio access network is similar to the distribution density of the secondary systems in the second radio access network, the average channel requirement of the first radio access network is quite different from the average channel requirement of the second radio access network, and the interference in the first radio access network is similar to the interference in the second radio access network. In addition, the two radio access networks partially overlap with each other, that is, E0 is less than a sum of E1 and E2. Thus, the determination unit 330 may determine the spectrum multiplexing manner for the two radio access networks as the manner of partial spectrum multiplexing. Further, the determination unit 330 may determine values of P1 and P2 based on the distribution densities of secondary systems respectively in the two radio access networks, the interference respectively in the two radio access networks, and the average channel requirement of the two radio access networks. Thus, for a radio access network having a greater distribution density of secondary systems, having more complex interference inside and having a greater average channel requirement, a ratio of spectrum resources allocated for the radio access network to total spectrum resources is greater. For example, the determination unit 330 may determine that P1 is equal to 0.8 and P2 is equal to 0.4. In FIG. 8(d), N1 is equal to 80, N2 is equal to 80, E1 is equal to 92, E2 is equal to 120, E0 is equal to 199, D1 is equal to 1.93, and D2 is equal to 2.04. That is, the distribution density of the secondary systems in the first radio access network is similar to the distribution density of the secondary systems in the second radio access network, the average channel requirement of the first radio access network is similar to the average channel requirement of the second radio access network, and the interference in the first radio access network is quite different from the interference in the second radio access network. In addition, the two radio access networks partially overlap with each other, that is, E0 is less than a sum of E1 and E2. Thus, the determination unit 330 may determine the spectrum multiplexing manner for the two radio access networks as the manner of partial spectrum multiplexing. Further, the determination unit 330 may determine values of P1 and P2 based on the distribution densities of secondary systems respectively in the two radio access networks, the interference respectively in the two radio access networks, and the average channel requirement of the two radio access networks. Thus, for a radio access network having a greater distribution density of secondary systems, having more complex interference inside and having a greater average channel requirement, a ratio of spectrum resources allocated for the radio access network to total spectrum resources is greater. For example, the determination unit 330 may determine that P1 is equal to 0.6 and P2 is equal to 0.8. Therefore, in a case that two radio access networks partially overlap with each other, the determination unit 330 may determine the spectrum multiplexing manner of the two radio access networks as the manner of partial spectrum multiplexing.

As described above, the determination unit 330 may determine a spectrum multiplexing manner for radio access networks, and may determine a ratio of spectrum resources allocated for a radio access network to total spectrum resources. According to an embodiment of the present disclosure, the determination unit 330 may perform the above processes by using machine learning. That is, the determination unit 330 may output a ratio of spectrum resources allocated for each of the radio access network to total spectrum resources by using a machine learning model. An input of the machine learning model may be one or more of the parameters of the interference overlap graph, and an output of the machine learning model may be a ratio of spectrum resources allocated for each of the radio access networks to total spectrum resources. For example, in a case that the coexistence system includes two radio access networks, the output of the machine learning model may be the values of P1 and P2.

According to an embodiment of the present disclosure, the determination unit 330 may use any machine learning model, which is not limited in the present disclosure. The machine learning model, such as a neural network (NN), may include a convolutional neural network (CNN), a recurrent neural network (RNN) model, a deep belief network (DBN), a generative adversarial network (GAN), and a Bayes classifier. In addition, a supervised learning model and an unsupervised learning model may be applied according to the different objects to be collected.

Figure 9:
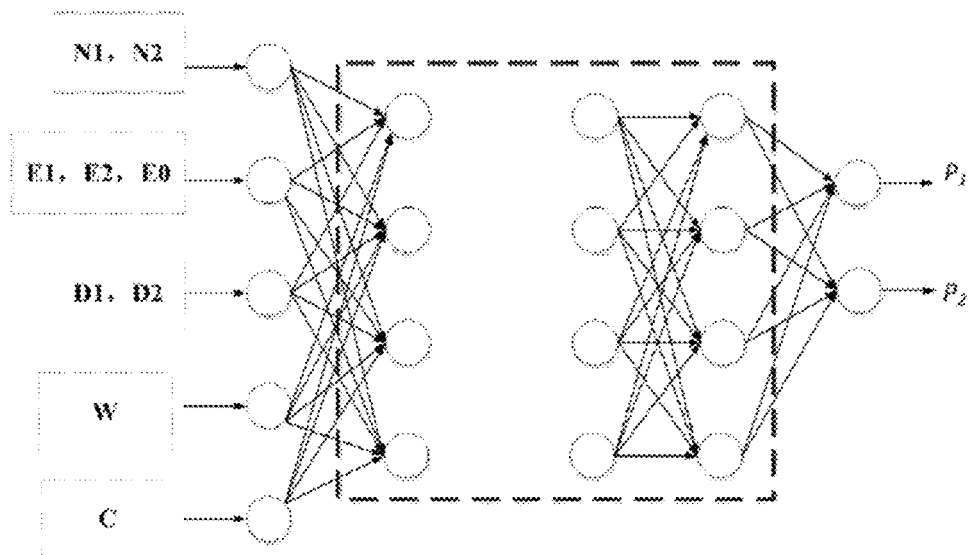
FIG. 9 shows a schematic structural diagram of a deep belief network.

FIG. 9 shows a schematic structural diagram of a deep belief network. In FIG. 9, an example in which the coexistence system includes two radio access networks is shown. As shown in FIG. 9, the input of the DBN network includes parameters of an interference overlap graph. The parameters include N1 and N2 which are related to the number of nodes, E1, E2, and E0 which are related to the number of lines, D1 and D2 which are related to the average channel requirement, W which is related to weight (W may include weights of all lines between nodes respectively included in two radio access networks), and the number C of radio access networks. The output of the DBN network includes the ratios P1 and P2 of spectrum resources respectively allocated for the two radio access networks to total spectrum resources. It should be noted that, although FIG. 9 shows an example including five input parameters, more or less parameters of the interference overlap graph may be included in practical applications. In addition, in generating the deep belief network model as shown in FIG. 9, a large amount of training data required to be generated, and labels (that is, the ratio of spectrum resources allocated for each of radio access networks to total spectrum resources) are set for the training data. The training may stopped until a training result meets a predetermined accuracy rate. By performing the above process, the deep belief network as shown in FIG. 9 may be generated, and the determination unit 330 may use this model to output the ratio of spectrum resources allocated for each of the radio access networks to total spectrum resources.

According to an embodiment of the present disclosure, the allocation unit 320 may, for each of radio access networks, allocate spectrum resources for the radio access network according to the ratio of spectrum resources allocated for the radio access network to total spectrum resources determined by the determination unit 330. That is, after the determination unit 330 determines a ratio of spectrum resources allocated for a radio access network to total spectrum resources, the allocation unit 320 may determine a position of spectrum resources to be allocated for the radio access network on the total spectrum resources, and thereby determine the spectrum resources allocated for the radio access network.

According to an embodiment of the present disclosure, the spectrum management apparatus 300 may transmit, for each of the radio access networks, the spectrum resources allocated for the radio access network to a spectrum division apparatus in the radio access network via the communication unit 340. For example, in the examples respectively shown in FIG. 1 and FIG. 2, the spectrum management apparatus 200 may transmit the spectrum resources allocated for the first radio access network to the spectrum division apparatus 1, and transmit the spectrum resources allocated for the second radio access network to the spectrum division apparatus 2. Further, the spectrum management apparatus 300 may transmit spectrum resources allocated for all of the radio access networks to each spectrum division apparatus via the communication unit 340. For example, in the examples respectively shown in FIG. 1 and FIG. 2, the spectrum management apparatus 200 may transmit the spectrum resources allocated for the first radio access network and the spectrum resources allocated for the second radio access network to the spectrum division apparatus 1, and may transmit the spectrum resources allocated for the first radio access network and the spectrum resources allocated for the second radio access network to the spectrum division apparatus 2.

That is, the spectrum management apparatus 300 may transmit the spectrum resources allocated for each radio access network and the interference overlap graph of the coexistence system to each spectrum division apparatus via the communication unit 340, so that each spectrum division apparatus may allocate spectrum resources for secondary systems managed by the spectrum division apparatus.

In addition, the spectrum management apparatus 300 may transmit the spectrum resources allocated for each radio access network and the interference overlap graph of the coexistence system to one spectrum division apparatus via the communication unit 340, so that the spectrum division apparatus may allocate spectrum resources for all the secondary systems in the coexistence system.

Further, according to an embodiment of the present disclosure, the spectrum management apparatus 300 may transmit spectrum resources allocated for each of the radio access networks to the secondary systems via the communication unit 340. For example, in the examples respectively shown in FIG. 1 and FIG. 2, the spectrum management apparatus 300 may transmit the spectrum resources allocated for the first radio access network and the spectrum resources allocated for the second radio access network to secondary systems 1 to 6.

Therefore, according to the embodiments of the present disclosure, the spectrum management apparatus 300 may allocate spectrum resources for radio access networks using different radio access technologies based on the interference overlap graph of the coexistence system. The spectrum management apparatus 300 may determine, based on the interference overlap graph of the coexistence system, a spectrum multiplexing manner for a radio access network and a ratio of spectrum resources allocated for the radio access network to total spectrum resources. Therefore, the spectrum management apparatus 300 may reasonably allocate spectrum resources for radio access networks using different radio access technologies based on the distribution of the radio access networks, thereby maximizing resource utilization and reducing interference between different radio access networks.

3. Configuration Examples of a Spectrum Division Apparatus

Figure 10:
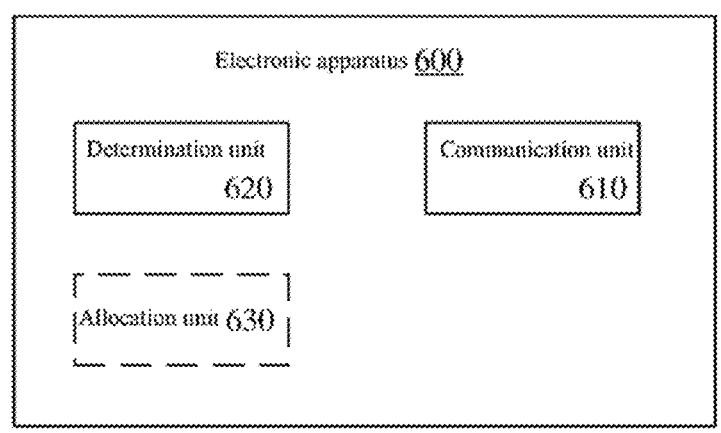
FIG. 10 is a block diagram showing an exemplary configuration of an electronic apparatus according to an embodiment of the present disclosure.

FIG. 10 is a block diagram showing a structure of an electronic apparatus 600 serving as a spectrum division apparatus in a wireless communication system according to an embodiment of the present disclosure. A coexistence system includes a first radio access network using a first radio access technology and a second radio access network using a second radio access technology. The first radio access network includes the electronic apparatus 600. The spectrum division apparatus may be a CxM.

As shown in FIG. 10, the electronic apparatus 600 may include a communication unit 610 and a determination unit 620.

The units of the electronic apparatus 600 may be included in processing circuitry. It should be noted that, the electronic apparatus 600 may include one or more processing circuitry. The processing circuitry may include various discrete functional units to perform different functions and/or operations. It should be noted that these functional units may be implemented as physical entities or logical entities, and units with different names may be implemented by a same physical entity.

According to an embodiment of the present disclosure, the electronic apparatus 600 may receive, from a spectrum management apparatus in the coexistence system via the communication unit 610, an interference overlap graph of the coexistence system, and spectrum resources allocated for the first radio access network and spectrum resources allocated for the second radio access network based on the interference overlap graph.

The spectrum management apparatus may be the spectrum management apparatus 300 described above. The interference overlap graph may be the interference overlap graph of the coexistence system generated by the spectrum management apparatus 300. The interference overlap graph, the spectrum resources allocated for the first radio access network and the spectrum resources allocated for the second radio access network have been described in detail, and are not repeated herein.

According to an embodiment of the present disclosure, the determination unit 620 may determine a spectrum resources allocation scheme for secondary systems in the coexistence system based on the interference overlap graph, the spectrum resources allocated for the first radio access network and the spectrum resources allocated for the second radio access network.

According to an embodiment of the present disclosure, the spectrum resources allocation scheme for secondary systems in the coexistence system may include spectrum resources allocated for each of the secondary systems in the coexistence system including the electronic apparatus 600. That is, the determination unit 620 may determine the spectrum resources allocated for the secondary systems in the first radio access network, and may determine the spectrum resources allocated for the secondary systems in the second radio access network.

According to an embodiment of the present disclosure, the determination unit 620 may determine an allocation sequence indicating a sequence order for allocating spectrum resources for the secondary systems in the coexistence system based on the interference overlap graph, the spectrum resources allocated for the first radio access network and the spectrum resources allocated for the second radio access network.

According to an embodiment of the present disclosure, the determination unit 620 may determine the allocation sequence based on an ant colony algorithm. A transition probability between nodes is determined based on channel requirements of the nodes and an average spectrum satisfaction of the interference overlap graph.

It is well known that the ant colony algorithm is a simulated evolutionary algorithm to mainly solve a traveling salesman problem. The basic concept of the ant colony algorithm is that, a walking path of an ant represents a feasible solution of a to-be-optimized problem, and all paths of the ant colony represent a solution space of the to-be-optimized problem. Ants with a short path release more pheromone, thus pheromones accumulated on the short path are higher over time, and more ants choose this path. Finally, the ant colony, based on a positive feedback, finds the shortest path, that is, the optimal solution.

According to the embodiment of the present disclosure, the transition probability between nodes is calculated based on the channel requirements of the nodes and the average spectrum satisfaction of the nodes in the interference overlap graph. Therefore, in allocating spectrum resources for the secondary systems in the allocation order, the spectrum resources are allocated based on the channel requirements of the nodes, optimizing the satisfaction of the allocated spectrum resources.

Hereinafter, the ant colony algorithm according to the embodiment of the present application is described in detail. It is assumed that the number of ant colony is M, the number of nodes in the interference overlap graph is N, that is, N=N1+N2, and a maximum iterations is Nmax. According to an embodiment of the present disclosure, M ants are randomly placed at N nodes. For each of the ants, the transition probability of the ant from node i to node j is calculated based on the following equation, then a node j with a largest transition probability is determined as a next node in the path.

$$p_{ij}^k = \frac{[\tau_{ij}]^\alpha \cdot [\eta_{ij}]^\beta}{\sum_{s \in Set} [\tau_{is}]^\alpha \cdot [\eta_{is}]^\beta}, j \in Set$$

In the above equation, $p_{ij}^k$ represents a transition probability of ant k from node i to node j, $\tau_{ij}$ represents an amount of accumulated pheromone from node i to node j, $\tau_{is}$ represents an amount of accumulated pheromone from node i to node s, $\eta_{ij}$ represents a heuristic factor from node i to node j, $\tau_{is}$ represents a heuristic factor from node i to node s, and Set represents a set of next nodes to be visited by ant k. Further, α represents an importance factor of a pheromone, β represents an importance factor of a heuristic factor, and α and β are constants.

According to an embodiment of the present disclosure, the heuristic factor from node i to node j may be determined based on a channel requirement of node j, that is, based on the following equation:

$$\eta_{ij} = d_j$$

In the above equation, $d_j$ represents the channel requirement of node j. $\eta_{is}$ may be calculated based on a similar equation. Further, according to an embodiment of the present disclosure, the heuristic factor from node i to node j may be determined based on other parameters of node j. For example, the heuristic factor from node i to node j may be determined based on the channel requirement of node j and a degree of the node j (that is, the number of lines including node j).

According to an embodiment of the present disclosure, $\tau_{ij}$ representing the amount of accumulated pheromone from node i to node j may be determined based on pheromone left by all the ants between node i and node j and the volatility of the pheromone. Specifically, $\tau_{ij}$ may be calculated based on the following equation. In addition, $\tau_{is}$ may be calculated based on a similar equation.

$$\tau_{ij} = (1-\rho) \cdot \tau_{ij} + \sum_{k=1}^{M} \Delta\tau_{ij}^k$$

where ρ represents a pheromone volatilization factor, and the range of ρ is (0,1); $\Delta\tau_{ij}^k$ represents pheromone left by the k-th ant on the path from node i to node j, and may be calculated based on the following equation:

$$\Delta\tau_{ij}^k = \begin{cases} Q \cdot \overline{S}, & \text{from node } i \text{ to node } j \text{ by ant } k \\ 0, & \text{otherwise} \end{cases}$$

where Q represents a total amount of pheromone secreted by the ants in one iteration; and $\overline{S}$ represents an average spectrum satisfaction of the nodes in the interference overlap graph, and may be calculated based on the following equation:

$$\overline{S} = \frac{1}{N} \cdot \sum_{i=1}^{N} s_i$$

In the above equation, $s_i$ represents a spectrum satisfaction of the i-th node. According to an embodiment of the present disclosure, the spectrum satisfaction of a node may be determined based on a ratio of the number of actually allocated channels to the number of requested channels.

As described above, according to the embodiments of the present disclosure, the pheromone left by the k-th ant on the path from node i to node j may be determined based on the average spectrum satisfaction of the nodes in the interference overlap graph, thereby determining the amount of accumulated pheromone on the path from node i to node j. Further, the heuristic factor from node i to node j may be determined based on the channel requirement of node j. Finally, the transition probability from node i to node j is determined based on the amount of accumulated pheromone on the path from node i to node j and the heuristic factor from node i to node j. Thus, the average spectrum satisfaction of the nodes and the channel requirements of the nodes are considered in determining the transition probability, so that the allocation sequence determined based on the ant colony algorithm may sort based on the channel requirements of the node, and a high average spectrum satisfaction is achieved.

The above process may be performed until all the ants visit all the nodes. That is, an allocation sequence is determined for each of the ants.

According to an embodiment of the present disclosure, the determination unit 620 may determine a spectrum resources allocation scheme for the secondary systems in the coexistence system according to the allocation sequence.

According to an embodiment of the present disclosure, in determining the spectrum resources allocation scheme for the secondary systems in the coexistence system, the determination unit 620 may, for each of the secondary systems, determine spectrum resources allocated for the secondary system based on the channel requirement of the secondary system, the requirement for a guard band between secondary systems respectively included in different radio access networks, the spectrum resources allocated for the first radio access network and the spectrum resources allocated for the second radio access network.

According to an embodiment of the present disclosure, the interference overlap graph acquired by the electronic apparatus 600 from the spectrum management apparatus may include a parameter of the interference overlap graph, for example, including a channel requirement of each of the secondary systems and requirements for a guard band between secondary systems respectively included in different radio access networks (that is, the weights of lines in the interference overlap graph).

According to an embodiment of the present disclosure, the determination unit 620 may allocate spectrum resources for the secondary systems in the coexistence system according to the allocation sequence. For example, in a case that the allocation sequence is 1-3-4-2-5-6, spectrum resources are allocated for node 1 first, then spectrum resources are allocated for node 3, and then spectrum resources are allocated for nodes 4, 2, 5, and 6 sequentially. In addition, in allocating spectrum resources, spectrum resources allocated for a node are determined from the spectrum resources allocated for the radio access network including the node based on the channel requirement of the node. Further, in allocating spectrum resources for a node, it is required to consider a requirement for a guard band between the node and a node which is before the node in the allocation sequence and is included in a radio access network different from the radio access network including the node. For example, in allocating spectrum resources for node 1, the spectrum resources allocated for node 1 are determined from the spectrum resources allocated for the first radio access network based on the channel requirement of node 1. The channel requirement of node 1 may include multiple channels or a single channel. Since node 1 is the first node in the allocation sequence, the determination unit 620 may fully meet the channel requirement of node 1. Next, the determination unit 620 may sequentially determine the spectrum resources for nodes 3, 4, and 2 in a similar way. Next, in allocating spectrum resources for node 5, the spectrum resources allocated for node 5 are determined from the spectrum resources allocated for the second radio access network based on the channel requirement of node 5, and it is required to consider the requirement for a guard band between node 5 and node 2 and the requirement for a guard band between node 5 and node 4.

According to an embodiment of the present disclosure, after the determination unit 620 allocates spectrum resources for the secondary systems according to the allocation sequence, the average spectrum satisfaction $\overline{S}$ of the nodes in the interference overlap graph may be calculated based on the equation described above, and the amount accumulated pheromone $\tau_{ij}$ on each of the paths according to the allocation sequence is updated.

According to an embodiment of the present disclosure, the above process is repeatedly performed and the number of iterations is increased by one until the number of iterations reaches the maximum iterations Nmax. The iteration may be stopped until the number of iterations reaches the maximum iterations Nmax, then an optimal allocation sequence and a spectrum resources allocation scheme for the secondary systems in the coexistence system determined according to the allocation sequence are outputted.

According to an embodiment of the present disclosure, the channel requirement of a node may include the number of channels requested by the node. The channel requirement of the node may include one or more channels. That is, according to the spectrum resources allocation scheme according to the embodiment of the present disclosure, one or more channels may be allocated for the node.

Figure 11A:
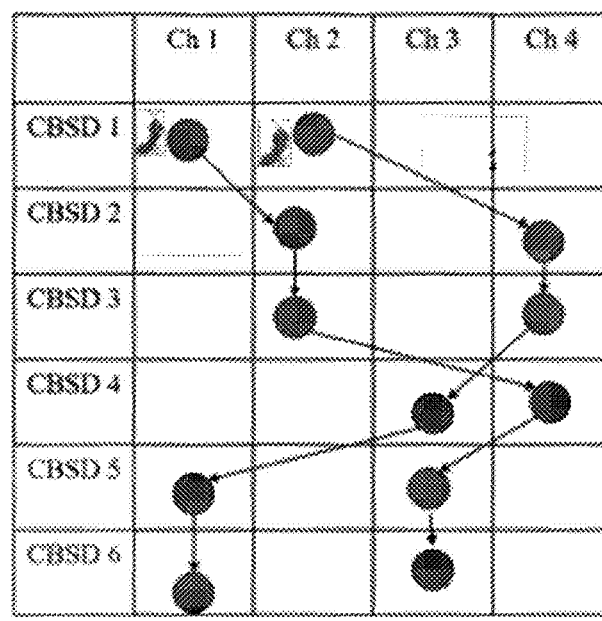
FIG. 11(a) shows a schematic diagram of a single channel ant colony algorithm.
Figure 11B:
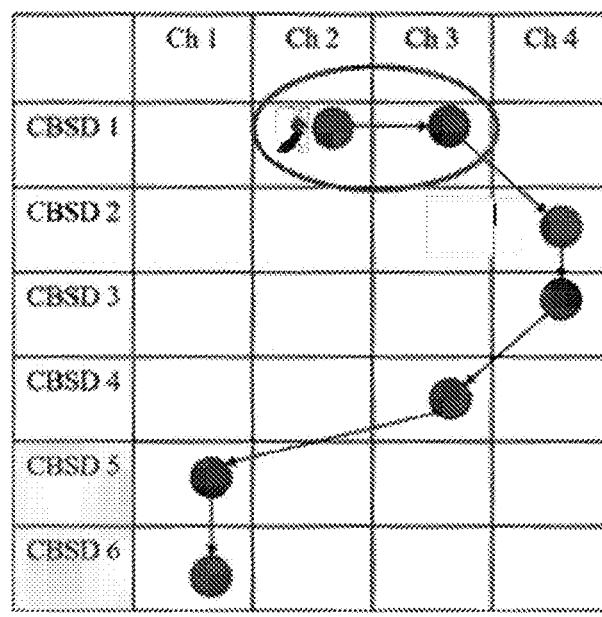
FIG. 11(b) shows a schematic diagram of a multi-channel ant colony algorithm according to an embodiment of the present disclosure.

FIG. 11(*a*) shows a schematic diagram of a single channel ant colony algorithm. FIG. 11(*b*) shows a schematic diagram of a multi-channel ant colony algorithm according to an embodiment of the present disclosure. In FIG. 11(*a*) and FIG. 11(*b*), CBSD1 to CBSD6 respectively represent the six secondary systems shown in FIG. 1, and Ch1 to Ch4 represent four channels in the available spectrum resources. In FIG. 11(*a*), a channel requirement of each of the secondary systems includes a single channel, thus one channel is allocated for each of the secondary systems according to the spectrum resources allocation scheme based on the ant colony algorithm. For example, in a spectrum resources allocation scheme determined by one ant, Ch1 is allocated for CBSD1, Ch2 is allocated for CBSD2 and CBSD3, Ch4 is allocated for CBSD4, and Ch3 is allocated for CBSD5 and CBSD6. In a spectrum resources allocation scheme determined by another ant, Ch2 is allocated for CBSD1, Ch4 is allocated for CBSD2 and CBSD3, Ch3 is allocated for CBSD4, and Ch1 is allocated for CBSD5 and CBSD6. In FIG. 11(*b*), the channel requirements of secondary systems 2 to 6 include one channel, and the channel requirement of secondary system 1 includes two channels. Therefore, in a spectrum resources allocation scheme based on the ant colony algorithm, channels may be allocated for the secondary systems based on the channel requirements of the secondary systems. For example, Ch2 and Ch3 are allocated for CBSD1, Ch4 is allocated for CBSD2, Ch4 is allocated for CBSD3, Ch3 is allocated for CBSD4, Ch1 is allocated for CBSD5, and Ch1 is allocated for CBSD6.

According to an embodiment of the present disclosure, the electronic apparatus 600 may determine the spectrum resources allocation scheme determined by the determination unit 620 as a final spectrum resources allocation scheme for the entire coexistence system. The electronic apparatus 600 may transmit the spectrum resources allocation scheme for the secondary systems in the coexistence system to the second spectrum division apparatus in the second radio access network via the communication unit 610, so that the second spectrum division apparatus allocates spectrum resources for the secondary systems in the second radio access network based on the spectrum resources allocation scheme.

According to an embodiment of the present disclosure, the electronic apparatus 600 may determine a final spectrum resources allocation scheme for the entire coexistence system. In this case, for example, the electronic apparatus 600 is a spectrum division apparatus having strong computing capability in the coexistence system or the electronic apparatus 600 is a spectrum division apparatus for management in the coexistence system. Therefore, the electronic apparatus 600 may determine a final spectrum resources allocation scheme for the coexistence system.

According to an embodiment of the present disclosure, after the determination unit 620 determines the spectrum resources allocation scheme, the electronic apparatus 600 may transmit the spectrum resources allocation scheme for the secondary systems in the coexistence system to the second spectrum division apparatus in the second radio access network via the communication unit 610. In addition, the electronic apparatus 600 may receive a spectrum resources allocation scheme for the secondary systems in the coexistence system determined by the second spectrum division apparatus from the second spectrum division apparatus via the communication unit 610. The second spectrum division apparatus may use a method similar the method used by the determination unit 620 to determine the spectrum resources allocation scheme for the secondary systems in the coexistence system.

According to an embodiment of the present disclosure, the determination unit 620 may determine the final spectrum resources allocation scheme based on the spectrum resources allocation scheme determined by the electronic apparatus 600 and the spectrum resources allocation scheme determined by the second spectrum division apparatus. Specifically, in determining the spectrum resources allocation scheme, the determination unit 620 may determine a network utility value corresponding to the spectrum resources allocation scheme. For example, the network utility value may be represented by the average spectrum satisfaction $\overline{S}$ of the nodes in the interference overlap graph. In addition, the determination unit 620 may receive, from the second spectrum division apparatus, a network utility value corresponding to the spectrum resources allocation scheme determined by the second spectrum division apparatus. The determination unit 620 may determine a spectrum resources allocation scheme with a large network utility value as the final spectrum resources allocation scheme.

As described above, both the electronic apparatus 600 and the second spectrum division apparatus may determine the spectrum resources allocation scheme for the coexistence system. That is, both the electronic apparatus 600 and the second spectrum division apparatus may perform the ant colony algorithm. Then, a spectrum resource allocation scheme having a large network utility value is selected from the spectrum resource allocation schemes determined by the spectrum division apparatuses as the final spectrum resource allocation scheme.

According to an embodiment of the present disclosure, as shown in FIG. 10, the electronic apparatus 600 may further include an allocation unit 630. The allocation unit 630 is configured to allocate spectrum resources for the secondary systems in the first radio access network.

According to an embodiment of the present disclosure, after the determination unit 620 determines the final spectrum resources allocation scheme for the coexistence system, the allocation unit 630 may allocate spectrum resources for the secondary systems in the first radio access network based on the final spectrum resources allocation scheme.

The electronic apparatus 600 according to the embodiment of the present disclosure may allocate spectrum resources for the secondary systems managed by the electronic apparatus 600 based on the interference overlap graph, spectrum resources allocated for the first radio access network, and spectrum resources allocated for the second radio access network transmitted by the spectrum management apparatus 300. Therefore, all the embodiments of the spectrum management apparatus 300 described above are applicable herein.

4. Configuration Examples of a Secondary System

Figure 12:
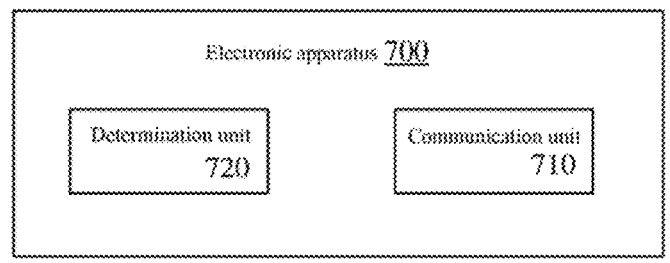
FIG. 12 is a block diagram showing an exemplary configuration of an electronic apparatus according to another embodiment of the present disclosure.

FIG. 12 is a block diagram showing a structure of an electronic apparatus 700 serving as a secondary system in a wireless communication system according to an embodiment of the present disclosure. A coexistence system includes a first radio access network using a first radio access technology and a second radio access network using a second radio access technology. The first radio access network includes the electronic apparatus 700. The secondary system may be a CBSD.

As shown in FIG. 12, the electronic apparatus 700 may include a communication unit 710 and a determination unit 720.

The units of the electronic apparatus 700 may be included in processing circuitry. It should be noted that, the electronic apparatus 700 may include one or more processing circuitry. The processing circuitry may include various discrete functional units to perform different functions and/or operations. It should be noted that these functional units may be implemented as physical entities or logical entities, and units with different names may be implemented by a same physical entity.

According to an embodiment of the present disclosure, the electronic apparatus 700 may receive, from a spectrum management apparatus in the coexistence system via the communication unit 710, an interference overlap graph of the coexistence system, and spectrum resources allocated for the first radio access network and spectrum resources allocated for the second radio access network based on the interference overlap graph.

The spectrum management apparatus may be the spectrum management apparatus 300 described above. The interference overlap graph may be the interference overlap graph of the coexistence system generated by the spectrum management apparatus 300. The interference overlap graph, the spectrum resources allocated for the first radio access network and the spectrum resources allocated for the second radio access network have been described in detail, and are not repeated herein.

According to an embodiment of the present disclosure, the determination unit 720 may determine a spectrum resources allocation scheme for secondary systems in the coexistence system based on the interference overlap graph, the spectrum resources allocated for the first radio access network and the spectrum resources allocated for the second radio access network.

According to an embodiment of the present disclosure, the spectrum resources allocation scheme for secondary systems in the coexistence system may include spectrum resources allocated for each of the secondary systems in the coexistence system including the electronic apparatus 700. That is, the determination unit 720 may determine the spectrum resources allocated for the secondary systems in the first radio access network, and may determine the spectrum resources allocated for the secondary systems in the second radio access network.

According to an embodiment of the present disclosure, the determination unit 720 may determine an allocation sequence indicating a sequence order for allocating spectrum resources for the secondary systems in the coexistence system, based on the interference overlap graph, the spectrum resources allocated for the first radio access network and the spectrum resources allocated for the second radio access network.

According to an embodiment of the present disclosure, the determination unit 720 may determine the allocation sequence based on an ant colony algorithm. A transition probability between nodes is determined based on channel requirement of the nodes and an average spectrum satisfaction of the interference overlap graph.

According to an embodiment of the present disclosure, the determination unit 720 may determine a spectrum resources allocation scheme for the secondary systems in the coexistence system according to the allocation sequence.

According to the embodiment of the present disclosure, the processes of determining an allocation sequence based on the ant colony algorithm and determining a spectrum resources allocation scheme for the secondary systems in the coexistence system based on the allocation sequence performed by the determination unit 720 are similar to the processes performed by the determination unit 620 in the electronic apparatus 600, which are not repeated herein. It should be noted that, in performing the ant colony algorithm by the determination unit 720, ants are placed at a node corresponding to the electronic apparatus 700, thus the allocation sequence determined by the determination unit 720 starts from the node corresponding to the electronic apparatus 700.

According to an embodiment of the present disclosure, after the determination unit 720 allocates spectrum resources for the secondary systems according to the allocation sequence, an average spectrum satisfaction $\bar{S}$ of the nodes included in the interference overlap graph may be calculated based on the equation described above, and the average spectrum satisfaction $\bar{S}$ is used as a network utility value. Further, pheromone $\Delta\tau_{ij}^k$ left by the k-th ant on the path from node i to node j may be calculated.

According to an embodiment of the present disclosure, the electronic apparatus 700 may transmit the spectrum resources allocation scheme for the secondary systems in the coexistence system to the spectrum division apparatus in the first radio access network via the communication unit 710. Preferably, the electronic apparatus 700 may transmit a network utility value corresponding to the determined spectrum resources allocation scheme to the spectrum division apparatus in the first radio access network.

In this case, the spectrum division apparatus in the first radio access network may receive, from each of the secondary systems managed by the spectrum division apparatus, a spectrum resources allocation scheme and a network utility value corresponding to the spectrum resources allocation scheme, and select a spectrum resources allocation scheme with a largest network utility value. The spectrum division apparatus in the first radio access network may update a pheromone matrix based on the spectrum resources allocation schemes for the secondary systems and the pheromone $\tau_{ij}^k$ left on the path from node i to node j.

The pheromone matrix may include, for example, an amount of accumulated pheromone $\tau_{ij}$ on a path between node i and node j. According to the embodiment of the present disclosure, the spectrum division apparatus in the second radio access network may perform an operation similar to the operation performed by the spectrum division apparatus in the first radio access network, that is, the operation of selecting a spectrum resources allocation scheme with a largest network utility value. Further, the spectrum division apparatus in the first radio access network and the spectrum division apparatus in the second radio access network may exchange the spectrum resources allocation schemes to determine the spectrum resources allocation scheme with the largest network utility value as the final spectrum resources allocation scheme.

As described above, according to the embodiment of the present disclosure, the electronic apparatus 700 serving as a secondary system may perform the ant colony algorithm to determine the allocation sequence and the spectrum resources allocation scheme. Thus, the calculation of the ant colony algorithm may be averagely performed by the secondary systems, thereby improving the execution efficiency of the ant colony algorithm and reducing the time delay.

The spectrum division apparatus according to the embodiment of the present disclosure may allocate spectrum resources for the electronic apparatuses 700 managed by the spectrum division apparatus based on the interference overlap graph, spectrum resources allocated for the first radio access network, and spectrum resources allocated for the second radio access network transmitted by the spectrum management apparatus. Therefore, all the embodiments of the spectrum management apparatus 300 and the spectrum division apparatus described above are applicable herein.

5. Method Embodiments

Figure 13:
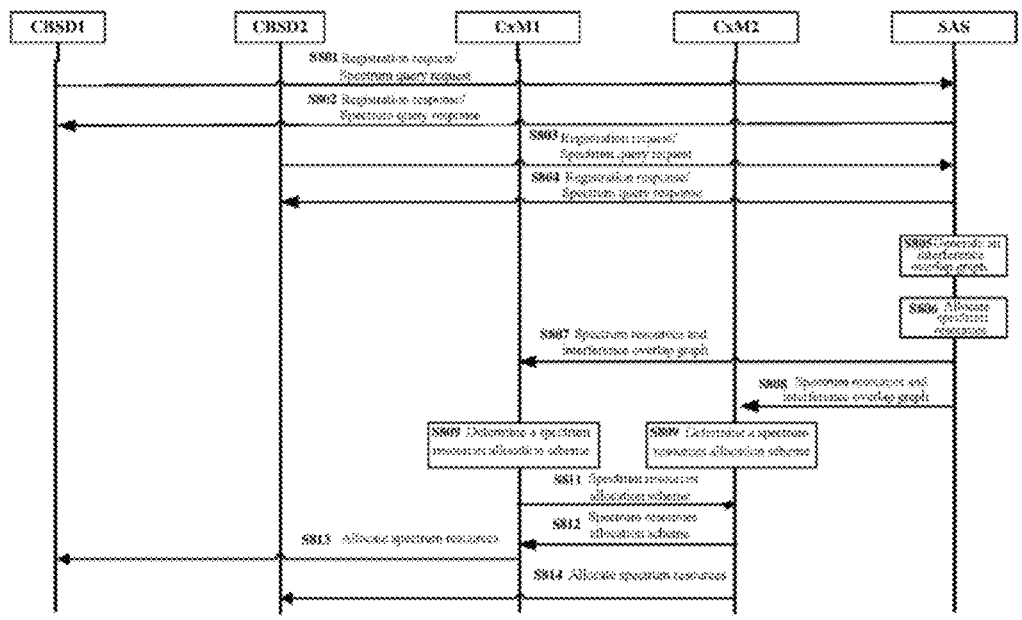
FIG. 13 is a signaling flow chart of a spectrum resources allocation process according to an embodiment of the present disclosure.
Figure 14:
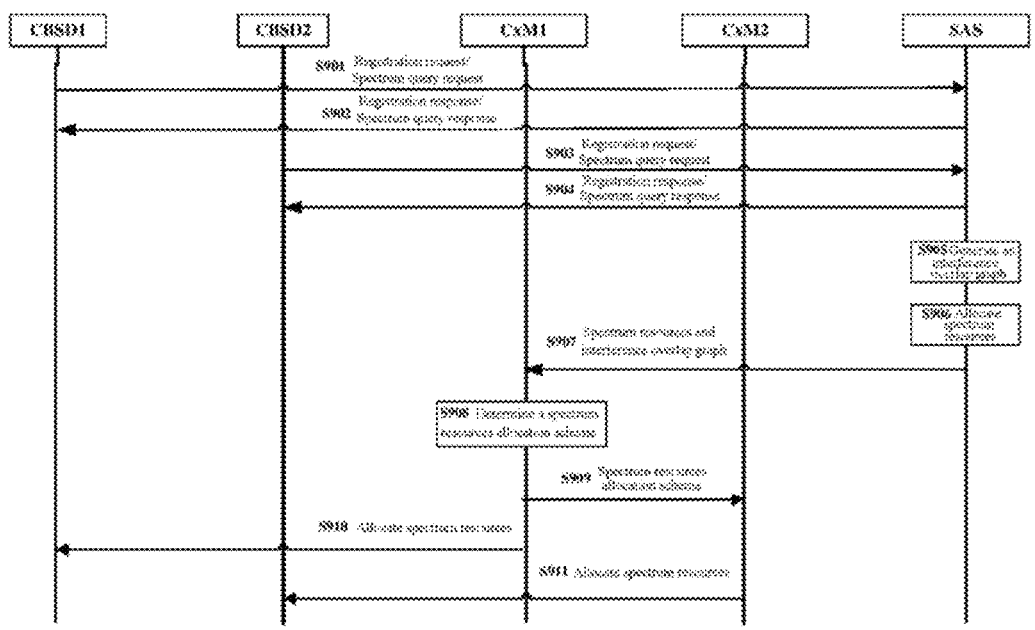
FIG. 14 is a signaling flow chart of a spectrum resources allocation process according to another embodiment of the present disclosure.
Figure 15:
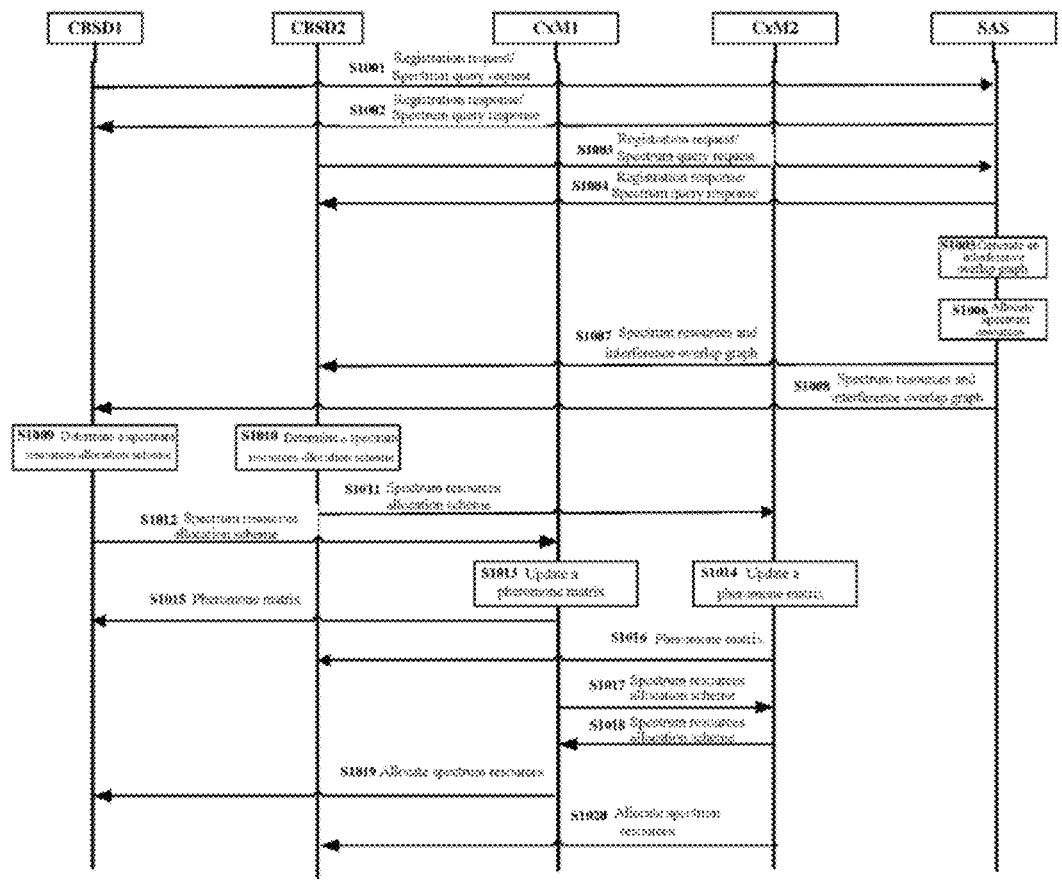
FIG. 15 is a signaling flow chart of a spectrum resources allocation process according to another embodiment of the present disclosure.

FIGS. 13 to 15 are signaling flow charts respectively showing a spectrum resources allocation process according to an embodiment of the present disclosure. In FIGS. 13 to 15, CBSD1 represents a secondary system in a first radio access network may be implemented by the electronic apparatus 700, and CBSD2 represents a secondary system in a second radio access network and may be implemented by the electronic apparatus 700, CxM1 represents a spectrum division apparatus in the first radio access network and may be implemented by the electronic apparatus 600, CxM2 represents a spectrum division apparatus in the second radio access network and may be implemented by the electronic apparatus 600, and SAS represents a spectrum management apparatus and may be implemented by the spectrum management apparatus 300.

In the example shown in FIG. 13, both CxM1 and CxM2 may perform the ant colony algorithm. As shown in FIG. 13, in step S801, CBSD1 sends a registration request and/or a spectrum query request to SAS. The registration request may include location information of CBSD1, and the spectrum query request may include channel requirement information of CBSD1. The registration request and the spectrum query request may be two discrete pieces of information, or may be combined into one piece of information. In step S802, SAS sends a registration response and/or a spectrum query response to CBSD1, including information such as an ID of CBSD1. Similarly, the registration response and the spectrum query response may be two discrete pieces of information, or may be combined into one piece of information. Similarly, in step S803, CBSD2 sends a registration request and/or a spectrum query request to SAS. The registration request may include location information of CBSD2, and the spectrum query request may include channel requirement information of CBSD2. In step S804, SAS sends a registration response and/or a spectrum query response to CBSD2, including information such as an ID of CBSD2. In step S805, SAS generates an interference overlap graph of the coexistence system. In step S806, SAS allocates spectrum resources for the first radio access network and the second radio access network based on the interference overlap graph. In step S807, SAS transmits the generated interference overlap graph, the spectrum resources allocated for the first radio access network, and the spectrum resources allocated for the second radio access network to CxM1. In step S808, SAS transmits the generated interference overlap graph, the spectrum resources allocated for the first radio access network, and the spectrum resources allocated for the second radio access network to CxM2. In step S809, CxM1 performs the ant colony algorithm to determine a spectrum resources allocation scheme. In step S810, CxM2 performs the ant colony algorithm to determine a spectrum resources allocation scheme. In steps S811 and S812, CxM1 and CxM2 exchange the spectrum resources allocation schemes. CxM1 and CxM2 may exchange network utility values respectively corresponding to the determined spectrum resources allocation schemes. CxM1 and CxM2 may respectively determine a spectrum resources allocation scheme with a largest network utility value as a final spectrum resources allocation scheme. In step S813, CxM1 allocates spectrum resources for CBSD1 based on the final spectrum resources allocation scheme determined by CxM1 and transmits the allocated spectrum resources to CBSD1. In step S814, CxM2 allocates spectrum resources for CBSD2 based on the final spectrum resources allocation scheme determined by CxM2 and transmits the allocated spectrum resources to CBSD2. Thus, spectrum resources are reasonably allocated for the secondary systems in the coexistence system.

In the example shown in FIG. 14, CxM1 executes the ant colony algorithm. As shown in FIG. 14, in step S901, CBSD1 sends a registration request and/or a spectrum query request to the SAS. The registration request may include location information of CBSD1, and the spectrum query request may include channel requirement information of CBSD1. In step S902, SAS sends a registration response and/or a spectrum query response to CBSD1, including information such as an ID of CBSD1. Similarly, in step S903, CBSD2 sends a registration request and/or a spectrum query request to SAS. The registration request may include location information of CBSD2, and the spectrum query request may include channel requirement information of CBSD2. In step S904, SAS sends a registration response and/or a spectrum query response to CBSD2, including information such as an ID of CBSD2. In step S905, SAS generates an interference overlap graph of the coexistence system. In step S906, SAS allocates spectrum resources for the first radio access network and the second radio access network based on the interference overlap graph. In step S907, SAS transmits the generated interference overlap graph, the spectrum resources allocated for the first radio access network, and the spectrum resources allocated for the second radio access network to CxM1. In step S908, CxM1 performs the ant colony algorithm to determine a spectrum resources allocation scheme and determine the spectrum resources allocation scheme as a final spectrum resources allocation scheme. In step S909, CxM1 transmits the final spectrum resources allocation scheme to CxM2. In step S910, CxM1 allocates spectrum resources for CBSD1 based on the final spectrum resources allocation scheme and transmits the allocated spectrum resources to CBSD1. In step S911, CxM2 allocates spectrum resources for CBSD2 based on the final spectrum resources allocation scheme and transmits the allocated spectrum resources to CBSD2. Thus, spectrum resources are reasonably allocated for the secondary systems in the coexistence system.

In the example shown in FIG. 15, both CBSD1 and CBSD2 may perform the ant colony algorithm. As shown in FIG. 15, in step S1001, CBSD1 sends a registration request and/or a spectrum query request to SAS. The registration request may include location information of CBSD1, and the spectrum query request may include channel requirement information of CBSD1. In step S1002, SAS sends a registration response and/or a spectrum query response to CBSD1, including information such as an ID of CBSD1. Similarly, in step S1003, CBSD2 sends a registration request and/or a spectrum query request to SAS. The registration request may include location information of CBSD2, and the spectrum query request may include channel requirement information of CBSD2. In step S1004, SAS sends a registration response and/or a spectrum query response to CBSD2, including information such as an ID of CBSD2. In step S1005, SAS generates an interference overlap graph of the coexistence system. In step S1006, SAS allocates spectrum resources for the first radio access network and the second radio access network based on the interference overlap graph. In step S1007, SAS transmits the generated interference overlap graph, the spectrum resources allocated for the first radio access network, and the spectrum resources allocated for the second radio access network to CBSD2. In step S1008, SAS transmits the generated interference overlap graph, the spectrum resources allocated for the first radio access network, and the spectrum resources allocated for the second radio access network to CBSD1. In step S1009, CBSD1 performs the ant colony algorithm to determine a spectrum resources allocation scheme. In step S1010, CBSD2 performs the ant colony algorithm to determine a spectrum resources allocation scheme. In step S1011, CBSD2 transmits the spectrum resources allocation scheme determined by CBSD2 to CxM2, optionally including a network utility value corresponding to the spectrum resources allocation scheme. In step S1012, CBSD1 transmits the spectrum resources allocation scheme determined by CBSD1 to CxM1, optionally including a network utility value corresponding to the spectrum resources allocation scheme. In step S1013, after receiving spectrum resources allocation schemes from all the secondary systems, CxM1 may update a pheromone matrix and determine a spectrum resources allocation scheme with an optimal network utility value. Similarly, in step S1014, after receiving spectrum resources allocation schemes from all the secondary systems, CxM2 may update a pheromone matrix and determine a spectrum resources allocation scheme with an optimal network utility value. In step S1015, CxM1 transmits the pheromone matrix updated by CxM1 to CBSD1 for performing a next iteration. In step S1016, CxM2 transmits the pheromone matrix updated by CxM2 to CBSD2 for performing a next iteration. In steps S1017 and S1018, CxM1 and CxM2 exchange the spectrum resources allocation schemes. CxM1 and CxM2 may exchange network utility values respectively corresponding to the determined spectrum resources allocation schemes. CxM1 and CxM2 may respectively determine a spectrum resources allocation scheme with a largest network utility value as a final spectrum resources allocation scheme. In step S1019, CxM1 allocates spectrum resources for CBSD1 based on the final spectrum resources allocation scheme and transmits the allocated spectrum resources to CBSD1. In step S1020, CxM2 allocates spectrum resources for CBSD2 based on the final spectrum resources allocation scheme and transmits the allocated spectrum resources to CBSD2. Thus, spectrum resources are reasonably allocated for the secondary systems in the coexistence system.

Hereinafter, a wireless communication method performed by a spectrum management apparatus 300 in a wireless communication system according to an embodiment of the present disclosure is described in detail. The spectrum management apparatus 300 may be, for example, an SAS. The coexistence system in which the spectrum management apparatus 300 is located includes at least two radio access networks using different radio access technologies.

Figure 16:
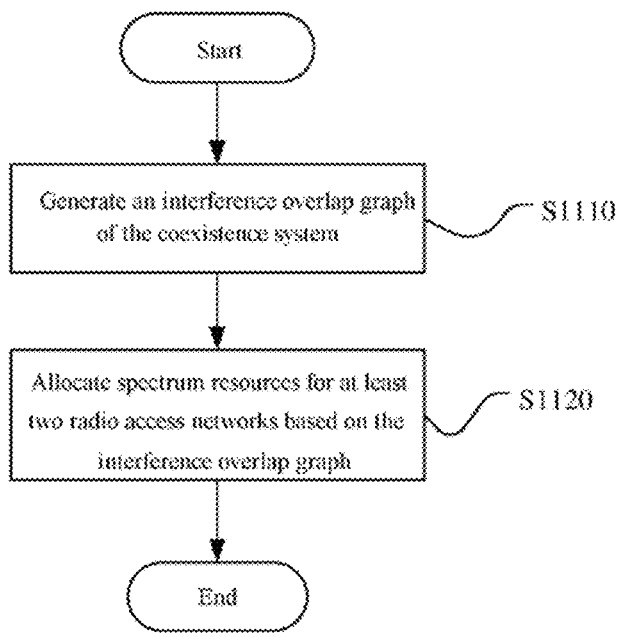
FIG. 16 is a flow chart of a wireless communication method performed by a spectrum management apparatus according to an embodiment of the present disclosure.

FIG. 16 is a flow chart of a wireless communication method performed by a spectrum management apparatus 300 in a wireless communication system according to an embodiment of the present disclosure.

As shown in FIG. 16, in step S1110, an interference overlap graph of the coexistence system is generated.

In step S1120, spectrum resources are allocated for at least two radio access networks based on the interference overlap graph.

Preferably, a node in the interference overlap graph represents a secondary system, and line between two nodes represents presence of interference between two secondary systems corresponding to the two nodes. The wireless communication method further includes allocating spectrum resources for the at least two radio access networks based on at least one of the following parameters of the interference overlap graph: the number of nodes included in each of the radio access networks, the number of lines included in each of the radio access networks, and number of lines between two nodes respectively included in two radio access networks.

Preferably, the allocating spectrum resources for the at least two radio access networks includes: determining a spectrum multiplexing manner for the at least two radio access networks based on the interference overlap graph of the coexistence system; and allocating spectrum resources for the at least two radio access networks based on the spectrum multiplexing manner.

Preferably, the spectrum multiplexing manner includes: a manner of no spectrum multiplexing, a manner of partial spectrum multiplexing, and a manner of full spectrum multiplexing.

Preferably, the allocating spectrum resources for the at least two radio access networks includes: for each of radio access networks, determining a ratio of spectrum resources allocated for the radio access network to total spectrum resources based on the interference overlap graph of the coexistence system, and allocating spectrum resources for the radio access network based on the ratio of spectrum resources allocated for the radio access network to total spectrum resources.

Preferably, the wireless communication method further includes: determining, for each of radio access networks, the ratio of spectrum resources allocated for the radio access network to total spectrum resources based on a channel requirement of the radio access network.

Preferably, the wireless communication method further includes: determining, for each of radio access networks, the ratio of spectrum resources allocated for the radio access network to total spectrum resources by using machine learning.

Preferably, the wireless communication method further includes: determining, based on a requirement for a guard band between two secondary systems respectively included in two radio access networks, a weight of a line between two nodes corresponding to the two secondary systems.

Preferably, the wireless communication method further includes: transmitting the interference overlap graph and the spectrum resources allocated for the at least two radio access networks to spectrum division apparatuses respectively included in the at least two radio access networks.

According to the embodiments of the present disclosure, the method may be performed by the spectrum management apparatus 300 according to the embodiments of the present disclosure. Therefore, all the embodiments of the spectrum management apparatus 300 described above are applicable herein.

Hereinafter, a wireless communication method performed by an electronic apparatus in a wireless communication system according to an embodiment of the present disclosure is described in detail. The electronic apparatus may serve as a spectrum division apparatus and a secondary system. The spectrum division apparatus may be, for example, a CxM. The secondary system may be, for example, a CBSD. The coexistence system in which the electronic apparatus is located includes a first radio access network using a first radio access technology and a second radio access network using a second radio access technology. The first radio access network includes the electronic apparatus.

Figure 17:
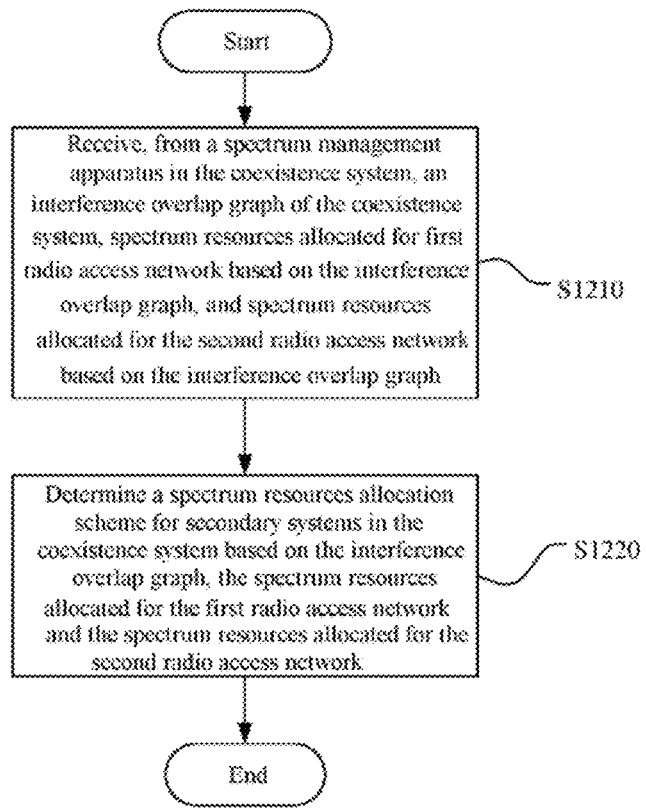
FIG. 17 is a flow chart of a wireless communication method performed by an electronic apparatus according to an embodiment of the present disclosure.

FIG. 17 is a flow chart of a wireless communication method performed by an electronic apparatus in a wireless communication system according to an embodiment of the present disclosure.

As shown in FIG. 17, in step S1210, an interference overlap graph of the coexistence system, spectrum resources allocated for first radio access network based on the interference overlap graph, and spectrum resources allocated for the second radio access network based on the interference overlap graph are received from a spectrum management apparatus in the coexistence system.

In step S1220, a spectrum resources allocation scheme for secondary systems in the coexistence system is determined based on the interference overlap graph, the spectrum resources allocated for the first radio access network and the spectrum resources allocated for the second radio access network.

Preferably, the determining a spectrum resources allocation scheme for secondary systems in the coexistence system includes: determining an allocation sequence indicating a sequence order in allocating spectrum resources for the secondary systems in the coexistence system based on the interference overlap graph, the spectrum resources allocated for first radio access network and the spectrum resources allocated for the second radio access network; and determining the spectrum resources allocation scheme for the secondary systems in the coexistence system based on the allocation sequence.

Preferably, the determining an allocation sequence includes: determining the allocation sequence based on an ant colony algorithm. A transition probability between nodes is determined based on channel requirements s of the nodes and an average spectrum satisfaction of the interference overlap graph.

Preferably, in a case that the electronic apparatus serves as a spectrum division apparatus, the wireless communication method further includes: transmitting the spectrum resources allocation scheme for the secondary systems in the coexistence system to a second spectrum division apparatus in the second radio access network; receiving, from the second spectrum division apparatus, a spectrum resources allocation scheme for the secondary systems in the coexistence system determined by the second spectrum division apparatus; and determining a final spectrum resources allocation scheme based on the spectrum resources allocation scheme determined by the electronic apparatus and the spectrum resources allocation scheme determined by the second spectrum division apparatus.

Preferably, in the case that the electronic apparatus serves as a spectrum division apparatus, the wireless communication method further includes: allocating spectrum resources for a secondary system in the first radio access network based on the spectrum resources allocation scheme for the secondary systems in the coexistence system.

Preferably, in a case that the electronic apparatus serves as a secondary system, the wireless communication method further includes: transmitting the spectrum resources allocation scheme for the secondary systems in the coexistence system to a spectrum division apparatus in the first radio access network.

According to the embodiments of the present disclosure, the method may be performed by the spectrum division apparatus and secondary system according to the embodiments of the present disclosure. Therefore, all the embodiments of the spectrum division apparatus and secondary system described above are applicable herein.

6. Application Examples

The technology of the present disclosure may be applied to various products.

For example, the spectrum management apparatus 300 and the spectrum division apparatus may be implemented by any types of servers, such as a tower server, a rack server and a blade server. The spectrum management apparatus 300 and the spectrum division apparatus may be a control module (such as an integrated circuit module including a single chip, and a card or a blade inserted in a slot of a blade server) installed in a server.

The secondary system may be implemented as any type of network side apparatus. The network side apparatus may be implemented as any type of TRP. The TRP may have transmitting and receiving functions. For example, the TRP may receive information from a user equipment and a base station device, and may transmit information to the user equipment and the base station device. In a typical example, the TRP may provide services for the user equipment and is controlled by the base station device. Further, the TRP may have a structure similar to the base station device described below, or may have a structure only related to transmission and reception of information in the base station device.

The network side apparatus may be implemented as any type of base stations, such as a macro eNB and a small eNB, and may be implemented as any type of gNB (a base station in a 5G system). The small eNB may be an eNB, such as a pico eNB, a micro eNB and a home (femto) eNB, which covers a cell smaller than a macro cell. Alternatively, the base station may be implemented as any other type of base station, such as a NodeB and a base station transceiver station (BTS). The base station may include a body (which is referred to as a base station device) configured to control wireless communications; and one or more remote radio heads (RRHs) arranged in a different position from the body.

<Application Examples of a Server>

Figure 18:
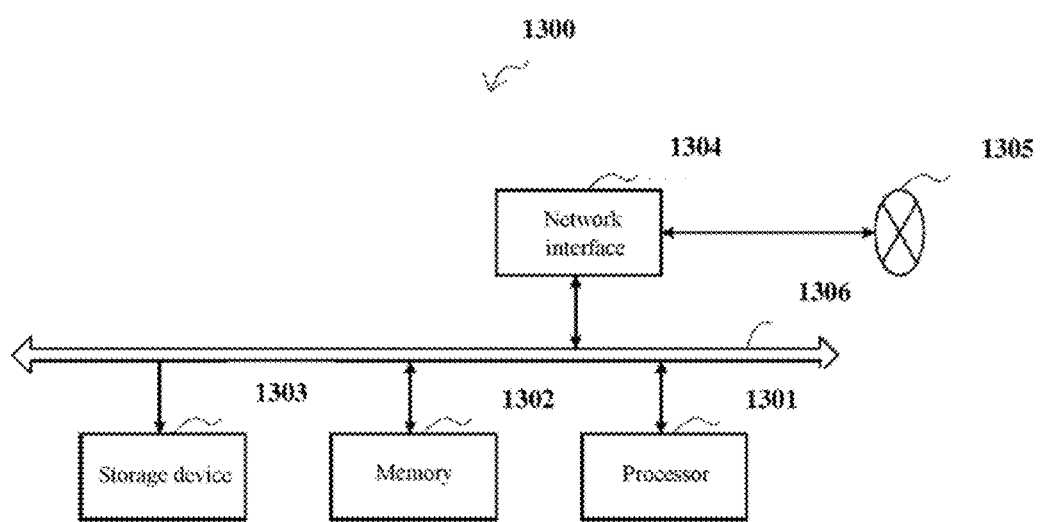
FIG. 18 is a block diagram showing an example of a schematic configuration of a server.

FIG. 18 is a block diagram showing an example of a server 1300 which may implement the spectrum management apparatus 300 and the spectrum division apparatus according to the present disclosure. The server 1300 includes a processor 1301, a memory 1302, a storage device 1303, a network interface 1304, and a bus 1306.

The processor 1301 may be, for example, a central processing unit (CPU) or a digital signal processor (DSP), and controls functions of the server 1300. The memory 1302 includes a random access memory (RAM) and a read-only memory (ROM), and stores data and a program that is executed by the processor 1301. The storage device 1303 may include a storage medium, such as a semiconductor memory and a hard disk.

The network interface 1304 is a wired communication interface for connecting the server 1300 to a wired communication network 1305. The wired communication network 1305 may be a core network such as an evolved packet core network (EPC) or a packet data network (PDN) such as the Internet.

The bus 1306 connects the processor 1301, the memory 1302, the storage device 1303 and the network interface 1304 to each other. The bus 1306 may include two or more buses having different speed respectively (such as a high speed buses and a low speed buses).

In the server 1300 shown in FIG. 18, the generation unit 310, the allocation unit 320, and the determination unit 330 described with reference to FIG. 3, and the determination unit 620 and the allocation unit 630 described with reference to FIG. 10 may be implemented by the processor 1301. The communication unit 340 described with reference to FIG. 3 and the communication unit 610 described with reference to FIG. 10 may be implemented by the network interface 1304. For example, the processor 1301 may generate an interference overlap graph, determine a spectrum multiplexing manner and a ratio of allocated spectrum resources to total spectrum resources, and allocate spectrum resources for a radio access network by executing instructions stored in the memory 1302 or the storage device 1303.

<Application Examples of a Base Station>

First Application Example

Figure 19:
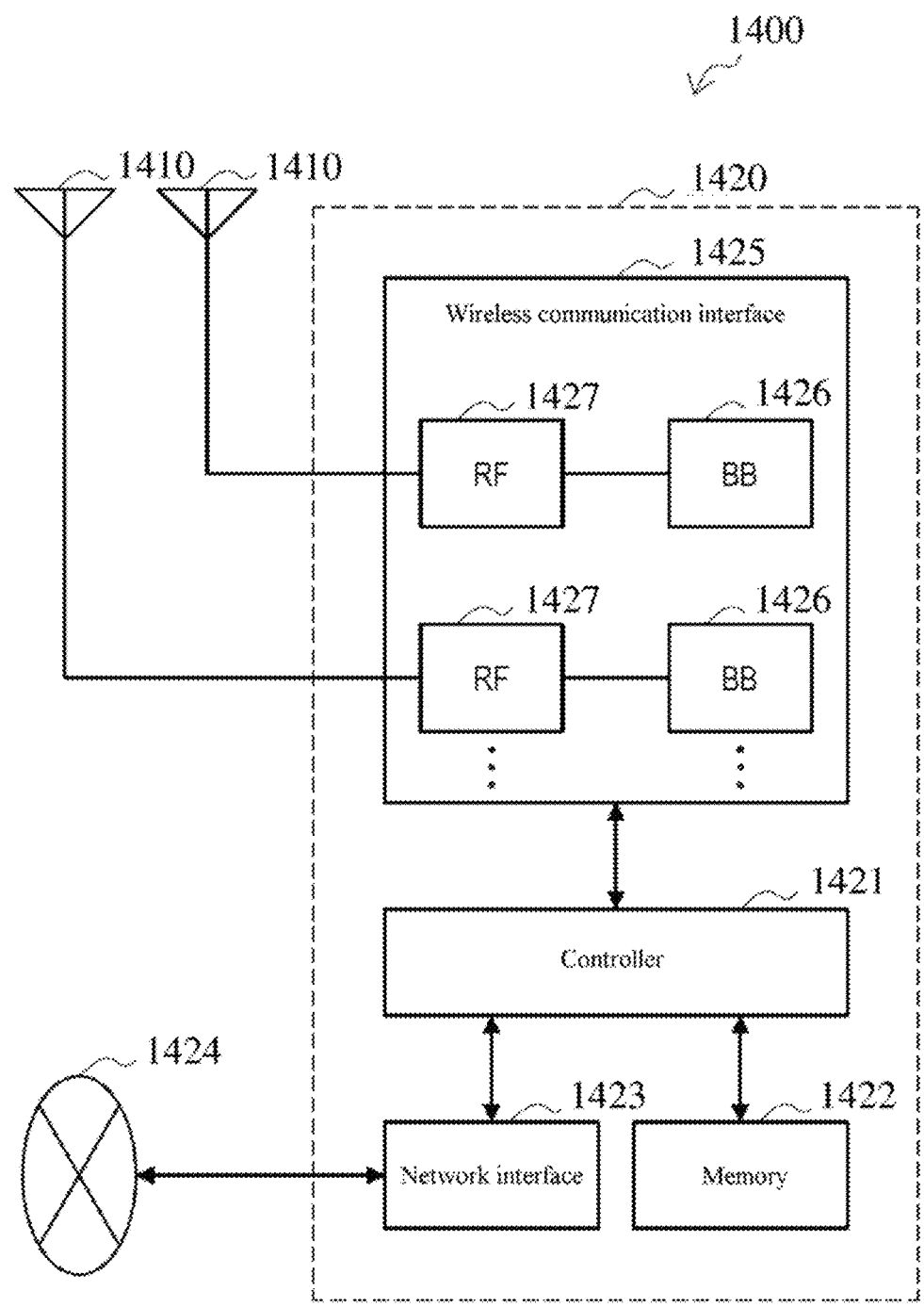
FIG. 19 is a block diagram of a first example of a schematic configuration of an evolved Node B (eNB)

FIG. 19 is a block diagram showing a first example of a schematic configuration of an eNB to which the technology of the present disclosure may be applied. An eNB 1400 includes one or more antennas 1410 and a base station device 1420. The base station device 1420 and each of the antennas 1410 may be connected to each other via a RF cable.

Each of the antennas 1410 includes a single or multiple antenna elements (such as multiple antenna elements included in a multiple-input multiple-output (MIMO) antenna), and is used for transmitting and receiving wireless signals by the base station device 1420. As shown in FIG. 19, the eNB 1400 may include multiple antennas 1410. For example, the multiple antennas 1410 may be compatible with multiple frequency bands used by the eNB 1400. Although FIG. 19 shows an example in which the eNB 1400 includes multiple antennas 1410, the eNB 1400 may include a single antenna 1410.

The base station equipment 1420 includes a controller 1421, a memory 1422, a network interface 1423, and a wireless communication interface 1425.

The controller 1421 may be, for example, a CPU or a DSP, and operate various functions of a higher layer of the base station device 1420. For example, the controller 1421 generates a data packet from data in signals processed by the wireless communication interface 1425, and transmits the generated packet via the network interface 1423. The controller 1421 may bundle data from multiple base band processors to generate a bundled packet, and transmit the generated bundled packet. The controller 1421 may have logical function of performing control such as radio resource control, radio bearer control, mobility management, admission control, and scheduling. The control may be performed in corporation with an eNB or a core network node in the vicinity. The memory 1422 includes a RAM and a ROM, and stores a program which is executed by the controller 1421, and various types of control data (such as a terminal list, transmission power data, and scheduling data).

The network interface 1423 is a communication interface for connecting the base station device 1420 to a core network 1424. The controller 1421 may communicate with a core network node or another eNB via the network interface 1423. In this case, the eNB 1400, and the core network node or the other eNB may be connected to each other via a logical interface (such as an S1 interface and an X2 interface). The network interface 1423 may also be a wired communication interface or a wireless communication interface for radio backhaul. If the network interface 1423 is a wireless communication interface, the network interface 1423 may use a higher frequency band for wireless communication than a frequency band used by the wireless communication interface 1425.

The wireless communication interface 1425 supports any cellular communication scheme (such as Long Term Evolution (LTE) and LTE-Advanced), and provides wireless connection to a terminal positioned in a cell of the eNB 1400 via the antenna 1410. The wireless communication interface 1425 may typically include, for example, a baseband (BB) processor 1426 and an RF circuitry 1427. The BB processor 1426 may perform, for example, encoding/decoding, modulating/demodulating, and multiplexing/de-multiplexing, and performs various types of signal processing of layers (such as L1, medium access control (MAC), radio link control (RLC), and packet data convergence protocol (PDCP)). Instead of the controller 1421, the BB processor 1426 may have some or all of the above-mentioned logical functions. The BB processor 1426 may be a memory storing a communication control program, or a module including a processor and a related circuit configured to execute the program. The functions of the BB processor 1426 may be changed by updating the program. The module may be a card or a blade that is inserted into a slot of the base station device 1420. Alternatively, the module may be a chip mounted on the card or the blade. In addition, the RF circuit 1427 may include, for example, a frequency mixer, a filter, and an amplifier, and transmits and receives radio signals via the antenna 1410.

As shown in FIG. 19, the wireless communication interface 1425 may include multiple BB processors 1426. For example, the multiple BB processors 1426 may be compatible with multiple frequency bands used by the eNB 1400. As shown in FIG. 19, the wireless communication interface 1425 may include multiple RF circuits 1427. For example, the multiple RF circuits 1427 may be compatible with multiple antenna elements. Although FIG. 19 shows an example in which the wireless communication interface 1425 includes multiple BB processors 1426 and multiple RF circuits 1427, the wireless communication interface 1425 may include a single BB processor 1426 or a single RF circuit 1427.

Second Application Example

Figure 20:
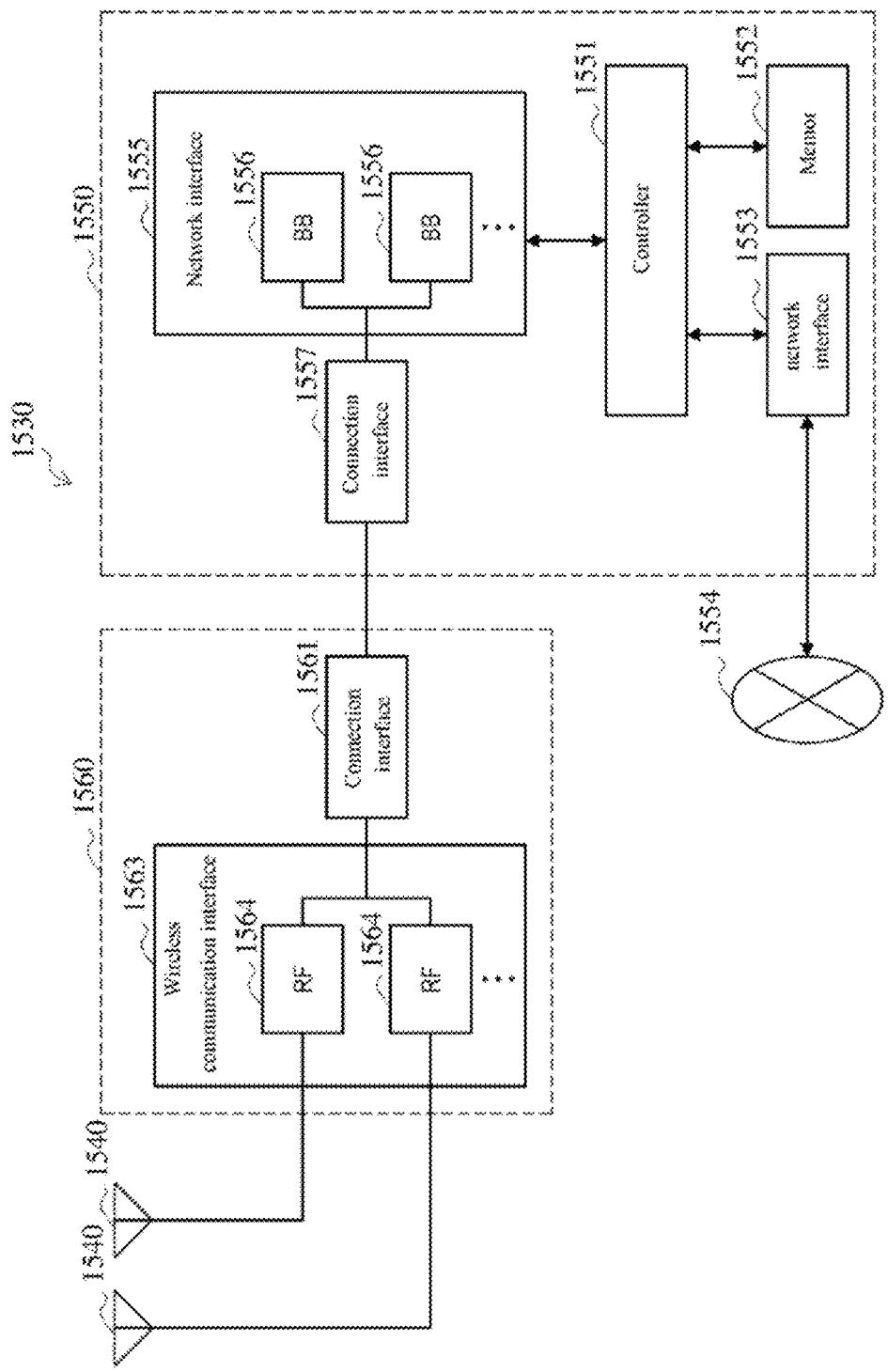
FIG. 20 is a block diagram of a second example of a schematic configuration of an eNB.

FIG. 20 is a block diagram showing a second example of a schematic configuration of an eNB to which the technology according to the present disclosure may be applied. An eNB 1530 includes one or more antennas 1540, a base station device 1550, and an RRH 1560. Each of the antennas 1540 and the RRH 1560 may be connected to each other via an RF cable. The base station device 1550 and the RRH 1560 may be connected to each other via a high speed line such as an optical fiber cable.

Each of the antennas 1540 includes a single or multiple antenna elements (such as multiple antenna elements included in an MIMO antenna), and is used for the RRH 1560 to transmit and receive radio signals. As shown in FIG. 20, the eNB 1530 may include multiple antennas 1540. For example, the multiple antennas 1540 may be compatible with multiple frequency bands used by the eNB 1530. Although FIG. 20 shows an example in which the eNB 1530 includes multiple antennas 1540, the eNB 1530 may include a single antenna 1540.

The base station device 1550 includes a controller 1551, a memory 1552, a network interface 1553, a wireless communication interface 1555, and a connection interface 1557. The controller 1551, the memory 1552, and the network interface 1553 are the same as the controller 1421, the memory 1422, and the network interface 1423 described with reference to FIG. 19.

The wireless communication interface 1555 supports any cellular communication scheme (such as LTE and LTE-Advanced), and provides wireless communication to a terminal positioned in a sector corresponding to the RRH 1560 via the RRH 1560 and the antenna 1540. The wireless communication interface 1555 may typically include, for example, a BB processor 1556. Other than connecting to an RF circuit 864 of the RRH 860 via the connection interface 857, the BB processor 1556 is the same as the BB processor 1426 described with reference to FIG. 19. As show in FIG. 20, the wireless communication interface 1555 may include multiple BB processors 1556. For example, the multiple BB processors 1556 may be compatible with multiple frequency bands used by the eNB 1530. Although FIG. 20 shows an example in which the wireless communication interface 1555 includes multiple BB processors 1556, the wireless communication interface 1555 may include a single BB processor 1556.

The connection interface 1557 is an interface for connecting the base station device 1550 (the wireless communication interface 1555) to the RRH 1560. The connection interface 1557 may be a communication module for communication of the above high-speed line, which is used for connecting the base station device 1550 (the wireless communication interface 1555) to the RRH 1560.

The RRH 1560 includes a connection interface 1561 and a wireless communication interface 1563.

The connection interface 1561 is an interface for connecting the RRH 1560 (the wireless communication interface 1563) to the base station device 1550. The connection interface 1561 may also be a communication module for the communication in the above high speed line.

The wireless communication interface 1563 transmits and receives wireless signals via the antenna 1540. The wireless communication interface 1563 may typically include, for example, an RF circuitry 1564. The RF circuit 1564 may include, for example, a frequency mixer, a filter, and an amplifier, and transmits and receives wireless signals via the antenna 1540. As shown in FIG. 20, the wireless communication interface 1563 may include multiple RF circuits 1564. For example, the multiple RF circuits 1564 may support multiple antenna elements. Although FIG. 20 shows an example in which the wireless communication interface 1563 includes multiple RF circuits 1564, the wireless communication interface 1563 may include a single RF circuit 1564.

In the eNB 1400 shown in FIG. 19 and the eNB 1530 shown in FIG. 20, the determination unit 720 described with reference to FIG. 12 may be implemented by the controller 1421 and/or the controller 1551. At least a part of the functions may be implemented by the controller 1421 and the controller 1551. For example, the controller 1421 and/or the controller 1551 may perform the function of determining the spectrum resources allocation scheme for the secondary systems by executing instructions stored in a corresponding memory.

Preferred embodiments of the present disclosure are described above with reference to the drawings. However, the present disclosure is not limited to the above embodiments. Those skilled in the art may make various alternations and modifications within the scope of the appended claims. It should be understood that these alternations and modifications shall naturally fall within the technical scope of the present disclosure.

For example, units shown by a dotted line block in the functional block diagram shown in the drawings indicate that the functional units are optional in the corresponding device, and the optional functional units may be combined appropriately to achieve required functions.

For example, multiple functions implemented by one unit in the above embodiments may be implemented by separate devices. Alternatively, multiple functions implemented by multiple units in the above embodiments may be implemented by separate devices, respectively. In addition, one of the above functions may be implemented by multiple units.

Such configurations are naturally included in the technical scope of the present disclosure.

In the specification, steps described in the flow diagram include not only the processes performed chronologically as the described sequence, but also the processes performed in parallel or individually rather than chronologically. Furthermore, the steps performed chronologically may be performed in another sequence appropriately.

The embodiments of the present disclosure have been described above in detail in conjunction with the drawings. However, it should be understood that the embodiments described above are intended to illustrate the present disclosure rather than limit the present disclosure. Those skilled in the art may make various modifications and variations to the above embodiments without departing from the spirit and scope of the present disclosure. Therefore, the scope of the present disclosure is defined by the appended claims and equivalents thereof

The invention claimed is:

1. A spectrum management apparatus comprising:
processing circuitry configured to:
  determine an interference between at least two radio access networks of a coexistence system, each of the at least two radio access networks using different radio access technologies;
  generate an interference overlap graph based on the determined interference;
  allocate spectrum resources for the at least two radio access networks based on the interference overlap graph; and
  a transceiver configured to transmit the interference overlap graph and the spectrum resources allocated for the at least two radio access networks to spectrum division apparatuses of the at least two radio access networks.

2. The spectrum management apparatus according to claim 1,
wherein the interference overlap graph includes a plurality of nodes connected by lines,
wherein each node in the interference overlap graph represents a secondary system, and each line that connects two nodes of the plurality of nodes represents presence of interference between two secondary systems corresponding to the two nodes, and
wherein the processing circuitry is further configured to allocate the spectrum resources for the at least two radio access networks based on each of the following parameters of the interference overlap graph:
  a number of nodes comprised in each of the at least two radio access networks,
  a number of lines comprised in each of the at least two radio access networks, and
  a number of lines between the nodes in each of the at least two radio access networks.

3. The spectrum management apparatus according to claim 1, wherein the processing circuitry is further configured to:
  based on the interference overlap graph of the coexistence system, perform a spectrum multiplexing determination for the at least two radio access networks; and
  allocate the spectrum resources for the at least two radio access networks based on the spectrum multiplexing determination.

4. The spectrum management apparatus according to claim 3, wherein the spectrum multiplexing determination comprises:
  determining that no spectrum multiplexing is used for the at least two radio access networks,
  determining that partial spectrum multiplexing is used for the at least two radio access networks, or
  determining that full spectrum multiplexing is used for the at least two radio access networks.

5. The spectrum management apparatus according to claim 3, wherein the processing circuitry is further configured to:
  for each of the at least two radio access networks,
  determine a ratio of spectrum resources allocated for the corresponding radio access network to total spectrum resources based on the interference overlap graph of the coexistence system; and
  allocate the spectrum resources for the corresponding radio access network based on the ratio of spectrum resources allocated for the radio access network to the total spectrum resources.

6. The spectrum management apparatus according to claim 5, wherein the processing circuitry is further configured to:
  determine, for each of the at least two radio access networks, the ratio of spectrum resources allocated for the radio access network to the total spectrum resources based on a channel requirement of the corresponding radio access network.

7. The spectrum management apparatus according to claim 5, wherein the processing circuitry is further configured to:
  determine, for each of the at least two radio access networks, the ratio of spectrum resources allocated for the radio access network to the total spectrum resources based on machine learning.

8. The spectrum management apparatus according to claim 2, wherein the processing circuitry is further configured to:
  determine, based on a requirement for a guard band between two secondary systems respectively comprised in the at least two radio access networks, a weight of a line between two nodes corresponding to the two secondary systems.

9. The spectrum management apparatus according to claim 1, wherein the spectrum management apparatus is a spectrum access system (SAS).

10. A wireless communication method performed by a spectrum management apparatus including processing circuitry and a transceiver, the wireless communication method comprising:
  determining an interference between at least two radio access networks of a coexistence system, each of the at least two radio access networks using different radio access technologies;
  generating an interference overlap graph based on the determined interference;
  allocating spectrum resources for the at least two radio access networks based on the interference overlap graph; and
  transmitting the interference overlap graph and the spectrum resources allocated for the at least two radio access networks to spectrum division apparatuses of the at least two radio access networks.

* * * * *